United States Patent
Tofte et al.

[11] Patent Number: 5,323,721
[45] Date of Patent: Jun. 28, 1994

[54] PLANTER MONITOR SYSTEM

[75] Inventors: Semor D. Tofte, Mankato; Steven W. Vogel, North Mankato; Dennis J. Berning; Thomas K. Hiniker, both of Mankato, all of Minn.

[73] Assignee: Micro-Trak Systems, Inc., Mankato, Minn.

[21] Appl. No.: 855,226

[22] Filed: Mar. 20, 1992

[51] Int. Cl.$^5$ ............................................. A01C 19/00
[52] U.S. Cl. ................... 111/200; 111/903; 111/904; 340/700; 222/40; 222/23; 221/9
[58] Field of Search ............... 111/200, 900, 903, 904; 222/63, 55, 40, 23; 221/8, 9, 3, 13; 340/200

[56] References Cited
U.S. PATENT DOCUMENTS

| | | |
|---|---|---|
| 3,723,989 | 3/1973 | Fathauer et al. |
| 3,855,953 | 12/1974 | Fathauer et al. |
| 3,912,121 | 10/1975 | Steffen . |
| 3,927,400 | 12/1975 | Knepler . |
| 3,928,751 | 12/1975 | Fathauer . |
| 4,009,799 | 3/1977 | Fathauer . |
| 4,085,862 | 4/1978 | Steffen . |
| 4,137,529 | 1/1979 | Anson et al. |
| 4,159,064 | 6/1979 | Hood . |
| 4,225,930 | 9/1980 | Steffen . |
| 4,268,825 | 5/1981 | Kaplan . |
| 4,277,833 | 7/1981 | Steffen . |
| 4,296,409 | 10/1981 | Whitaker et al. |
| 4,333,096 | 6/1982 | Jenkins et al. |
| 4,491,241 | 1/1985 | Knepler et al. |
| 4,523,280 | 6/1985 | Bachman . |
| 4,551,801 | 11/1985 | Sokol . |
| 4,803,626 | 2/1989 | Bachman et al. |
| 4,924,418 | 5/1990 | Bachman et al. |

OTHER PUBLICATIONS

"ST-424 Potato Planter Monitor, Installation-/Operator's Manual" Mar. 1992.
ST-424 User's Manual draft Mar. 1992.
Hiniker Computer Scan Brochure, Feb. 1979.
Hiniker Computer Facts, Jan. 1983.
John Deere Harvester Works, OM-H135741 Issue L7, "7200 Flex-Fold 16-Narrow-Row MaxEmerge® 2 Drawn Planters, Operator's Manual", date unknown, pp. 60-1 through 60-20.
Micro-Trak Systems, Inc., "PC2 Planter Computer, User's Manual", First Edition Dec. 1986, pp. 1-64.

*Primary Examiner*—Randolph A. Reese
*Assistant Examiner*—Spencer Warnick
*Attorney, Agent, or Firm*—Merchant, Gould, Smith, Edell, Welter & Schmidt

[57] ABSTRACT

A planter monitor system monitors, measures and displays a plurality of planter performance parameters. The system includes a display console, a plurality of row unit modules and a plurality of seed sensors. The system can be used with a wide variety of planters made by different manufacturers and on many different planter types. The system can accurately monitor a wide variety of seed types (e.g. both small and large) and a wide variety of seed planting rates (low and high) and any combination thereof which can occur within the wide scope of seed planting. The system calculates an error rate from a set of data, in graph form, representing experimentally determined actual seed rates versus seed rates as would be measured, thus allowing the operator to optimize seed population and distribution by adjusting the speed of the planter apparatus and/or the seed distribution system. The accuracy of the monitor system is not affected by the wide variety of environmental conditions, such as the presence of dirt and moisture, in which such planters must necessarily be used.

8 Claims, 47 Drawing Sheets

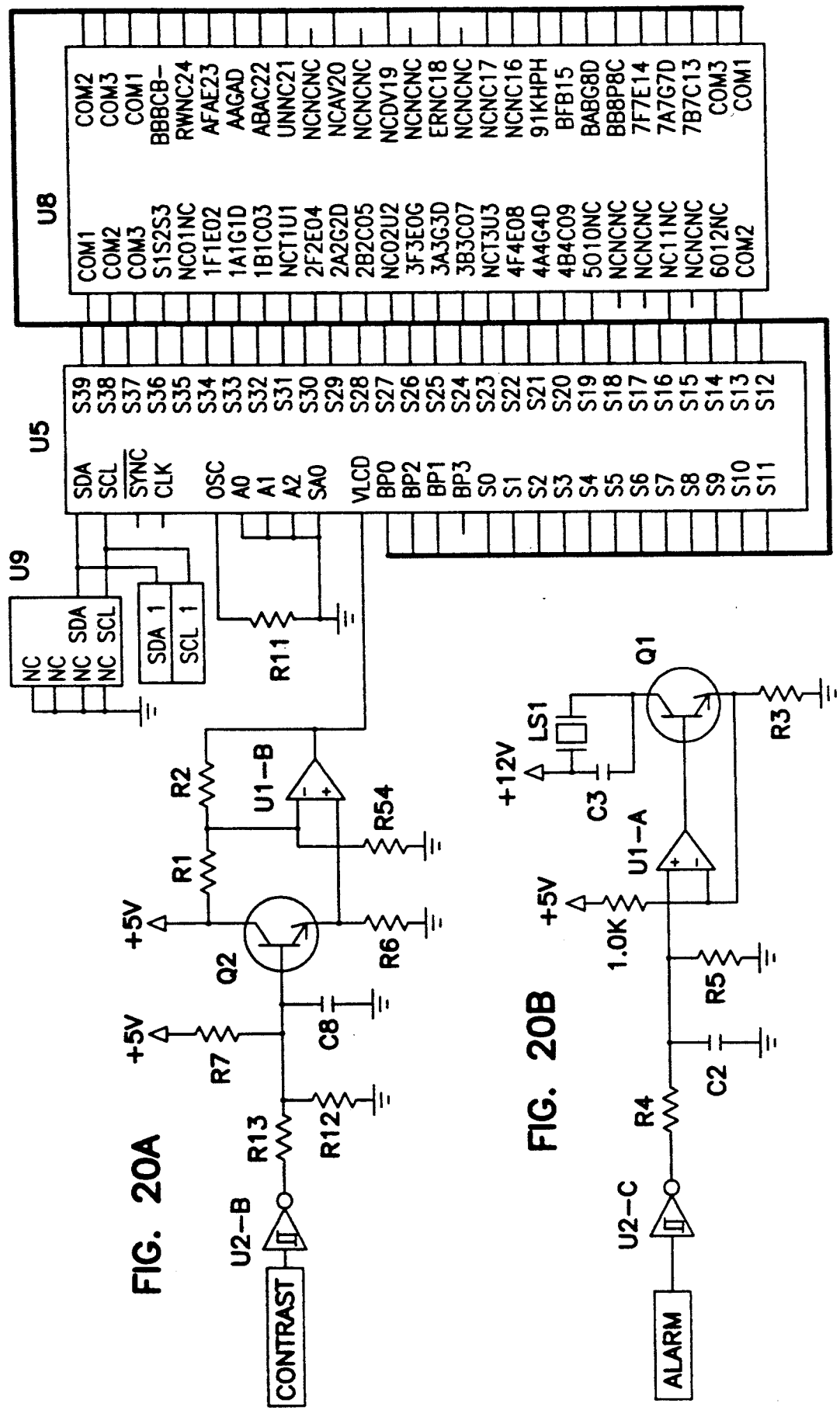

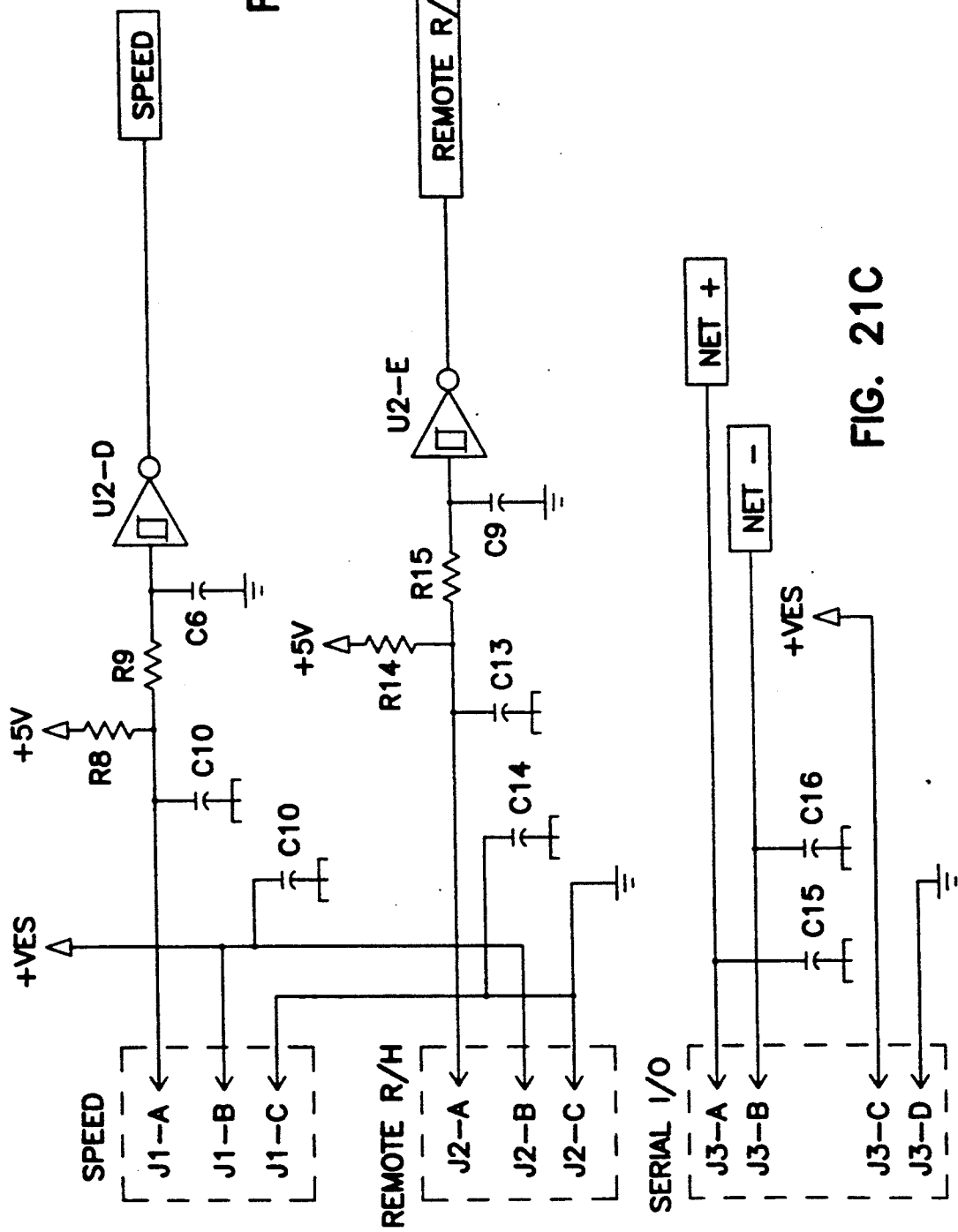

PLANTER MONITOR SYSTEM

FIELD OF THE INVENTION

The present invention relates generally to monitor systems, and more specifically to a microcontrolled monitor system for monitoring and displaying performance information of a mobile seed planting apparatus.

BACKGROUND OF THE INVENTION

In general, a mobile planting apparatus is used in agricultural applications where manual seed planting would be impractical. The mobile planting apparatus is most often designed and dedicated to the particular application, since each type of seed usually will differ in physical characteristics, optimum plant spacing, optimum planting depth, etc. Thus there are different planters for corn (medium seed, low seed rate), potatoes (large seed, low seed rate), soybeans (very small seed, very high seed rate), etc.

The mobile planting apparatus is equipped with a control system and a seed delivery or distribution system. The control system controls the flow or supply of seeds fed to the distribution system, and the distribution system plants the seed or seeds at the proper seed spacing and depth. Because many mobile planting apparatus are able to plant a plurality of rows simultaneously, each planting apparatus usually incorporates a plurality of control and distribution systems, one set for each row.

Although a mobile planting apparatus of the type just described greatly increase the efficiency with which planting can be achieved, they do have some limitations. The most important limitation is that the operator receives no feedback concerning the planter performance. Accordingly, there is a need for a system which can monitor and display planter performance data control and distribution systems.

An example of an existing planter monitor system is the PC2 Planter Computer manufactured by Micro-Trak Systems, Inc., the assignee of the present invention, and which is described in "PC2 Planter Computer User's Manual," First Edition, Revision 1-1, December 1986, which is incorporated herein by reference. However, this planter monitor system is limited in the amount of performance data monitored and displayed.

There are several planter performance parameters of which there is a need for the operator to receive feedback. For example, it would be desirable to alert the operator in the case of a malfunction, such as if one of the seed delivery systems becomes blocked. Also, the system should display or identify the locality or region of malfunction.

There is also a need for a system which monitors a selected row or rows being planted to obtain a distribution record of the selected row or rows. This feature would allow the operator to identify intermittent malfunctions of the mobile planting apparatus in addition to the identification of total malfunctions.

There is also a need for a monitor which can calculate and display the deviation from the optimal seed population and distribution. Such a system must monitor the ground speed of the mobile planting apparatus and the performance of each row to calculate a seed rate, population or spacing, and which further compares the calculated performance with the optimal seed rate population or spacing and which displays the percent error deviation from the optimal performance. This feature would allow the operator to optimize seed population and distribution by providing the operator with the necessary information to make adjustments to the speed of the mobile planting apparatus and/or to the control and distribution systems of the mobile planting apparatus to arrive at the optimal seed population and distribution.

There is further a need for a generic monitoring system which can be used on many planters made by different manufactures and which can be used on many different types of planters (e.g. potatoes, corn or soybean planters). To accomplish this latter goal, the planter monitor system must be able to accurately monitor a wide variety of seed types (large and small) and a wide variety of seed planting rates (high and low) and any combination thereof which can occur within the scope of seed planting. Such a generic system would ensure that a minimum of modifications were required to adapt the monitoring system to fit any seed planting application.

Another drawback with existing planter apparatus and monitors is that cannot accurately monitor the performance across the wide variety of environmental conditions in which such planters must necessarily be used. The presence of dirt and moisture greatly reduces the accuracy of existing planter monitors due to the nature of the seed sensors used to detect seeds being planted. Another drawback to existing monitors is that there is very little if any flexibility in the manner in which existing monitors scan the planted rows. For example, while it may be desirous at some times to continuously and sequentially scan all planting rows and display the corresponding data, it may at other times be more advantageous to constantly view the performance characteristics of only a single row for a period of time, or still at other times to display only those rows which are planting out of certain specified limits.

Finally, it is desirable to make the monitoring system as "user-friendly" as possible. A user-friendly monitor system would include some type of display and user console for interacting with the operator. The display and user console would provide multiple types of user selected planter performance data in an easy to use format.

SUMMARY OF THE INVENTION.

To overcome the deficiencies in the art described above and to overcome other deficiencies which will become apparent upon reading and understanding the present specification and drawings, the present invention provides a planter monitor system used to monitor and display the performance of a mobile seed planting apparatus. The system monitors a large variety of planter performance parameters, all of which are displayed on a Liquid Crystal Display (LCD) screen. The system comprises a plurality of seed sensors, one set for each row being planted, a plurality of row units for receiving the seed sensor data and transmitting it to a console. The console includes an LCD display screen and various select switches through which the user may choose the performance data to be displayed.

The LCD is designed to simultaneously display planter speed, row error blips to give the operator a continuous view of each row's behavior, a row number, and chosen numerical data. The numerical data can be either row planting information or ground measurement information. Row planting information includes seed spacing, population, seed rate and percent error while ground measurement information includes distance traveled, field acres, and total acres.

The invention further utilizes three different methods of scanning through all calibrated rows. This feature gives the operator greater flexibility in viewing the planter data. The invention is able to accurately monitor both low seed rate applications (such as potatoes or corn) and high seed rate applications (such as soybeans). The invention also has a visual and audible error message system. Two alarms are present, one for alerting the operator to planting errors and another different alarm for vital errors such as machine malfunction. The accuracy of the planter monitor system is not affected by the varying levels of dirt and moisture necessarily encountered in the seed planting environment. The seed sensors are installed on the rows of the planter. The invention is able to monitor a maximum of twenty-four rows, and many combinations may be used. This feature adds flexibility in matching the invention to the many configurations of planters.

When the invention is in operation, each seed sensor sends a signal to the row unit when a passing seed is detected. The row unit accumulates the "seed" signals from each row and proceeds in calculating the seed spacing in units of mm/seed. The row unit then sends the seed spacing information for each row to the console for further processing. The console processes the seed data of each row and displays the output in the row data format which the operator has chosen (spacing, population, rate, or % error). The output may be displayed in either metric or english units. The seed information received from the row unit is used to determine application errors as well as other functions.

BRIEF DESCRIPTION OF THE DRAWINGS

In the drawings, where like numerals refer to like elements throughout the several views:

FIGS. 18A-18B, 19A-19B, 20A-20C and 21A-21C are a detailed schematic diagram of the planter monitor system console of the present invention;

DETAILED DESCRIPTION OF THE INVENTION

In the following detailed description of the preferred embodiment, reference is made to the accompanying drawings which form a part hereof, and in which is shown by way of illustration a specific embodiment in which the invention may be practiced. It is to be understood that other embodiments may be utilized and structural changes made without departing from the scope of the present invention.

Figure 1:
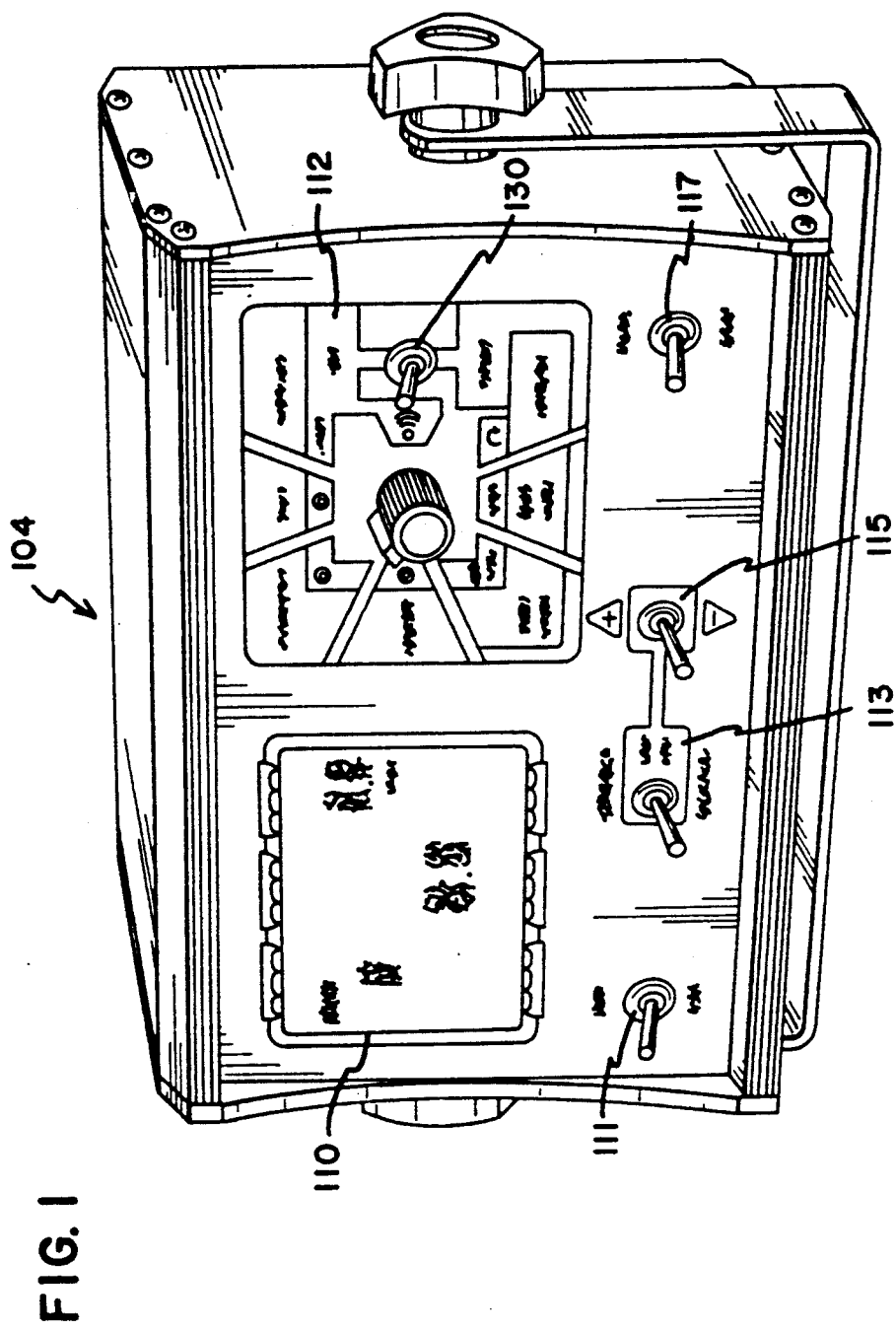
FIG. 1 shows the planter monitor system console of the present invention, which includes a LCD display, selector switches and toggle switches.

FIG. 1 shows the planter monitor system console of the present invention. The console is preferably weatherproof and includes a liquid crystal display (LCD) 110 which displays the speed and row performance data. These readouts include SPACING (spacing between seeds, measured in acres or hectares, or feet or meters, etc.) POPULATION (seeds per acre/hectare), RATE (seeds per foot/meter), FIELD AREA ( acres/hectares ), TOTAL AREA ( acres/hectares) and DISTANCE (feet/meters). The FIELD AREA, TOTAL AREA and DISTANCE counters may all be reset to zero independent of each other.

Console 104 also includes a multiposition select switch 112. This switch is used to select which of the available functions will be displayed in the six digit bottom readout of LCD display 110. To select a function for display, the operator simply turns the rotary selector switch to the desired position. The functions which can be displayed include % ERROR, SEED RATE, POPULATION, SPACING, TOTAL AREA, FIELD AREA, DISTANCE and ALARM VOLUME.

Figure 2:
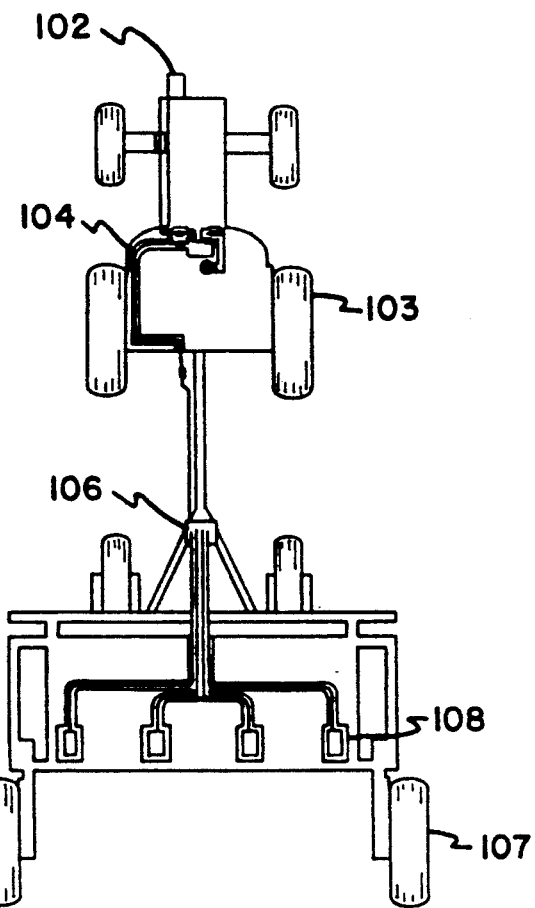
FIG. 2 is an aerial view of a mobile planting apparatus showing the location of the various components of the planter monitor system of the present invention.

FIG. 2 shows the location of the various parts of the planter monitor system of the present invention mounted on a mobile planting apparatus. Console 104 is located near the operator controls to provide easy access to the console control switches and a clear view of the LCD display panel. Speed sensor 102, preferably of the sonar type, is located at the front of the planter. Although a sonar type speed sensor is preferred, those skilled in the art will readily recognize that a radar or other type speed sensor could also be used without departing from the scope of the present invention. At least one row unit 106 is mounted on the frame of the planter or some other convenient place. Each row unit 106 will accept multiple seed sensor inputs. Multiple row unit modules may further be used in a plurality of configurations to monitor a larger number of rows. Seed sensors 108 are located at or near the planter shoe such that the planter will drop the seeds through the sensor. The preferred configuration calls for up to four row units, wherein each row unit will accept up to eight seed sensor inputs for a total monitoring capability of twenty four rows in the preferred embodiment. Those skilled in the art will readily recognize that any number of row units, each accepting any number of seed sensor inputs, could be substituted for the preferred embodiment described herein without departing from the scope of the present invention.

Figure 3:
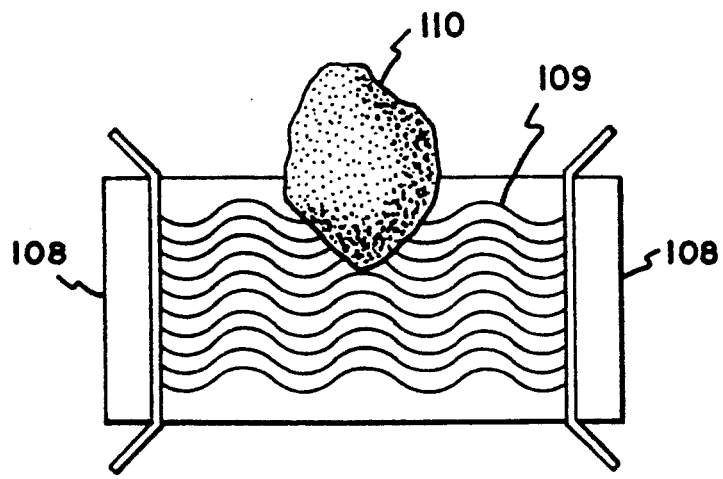
FIG. 3 shows a representation of a seed falling between the seed sensors of the present invention.

FIG. 3 shows a seed 110 falling between seed sensors 108 of the present invention. The open area between seed sensors 108 is bridged by an electric field 109. Each seed piece that drops through this field 109 is detected by electronic circuitry and recorded by console 104. Counting accuracy is highly consistent regardless of size, shape or spacing between seeds. Those skilled in the art will readily appreciate that the use of electric detection technology has many advantages over the sensor technology used in other seed sensing means, such as photoelectronics. Photoelectric technology requires continuous cleaning of the seed sensors so that the sensors can "see" the seeds. The use of electric field eliminates the need to continuously clean the sensors— even when encrusted with dirt the electric sensors of the present invention remain highly accurate. The electric seed sensors of the present invention are therefore virtually unaffected by the presence of dirt and moisture necessarily encountered under all seed planting conditions. A detailed description of the seed sensors of the present invention is given in U.S. Pat. No. 4,710,757, to W. C. Haase, entitled "PLANTER MONITOR SYSTEM", issued Dec. 1, 1987, assigned to Micro-Trak Systems, Inc. the assignee of the present invention, which is incorporated herein by reference.

Figure 4:
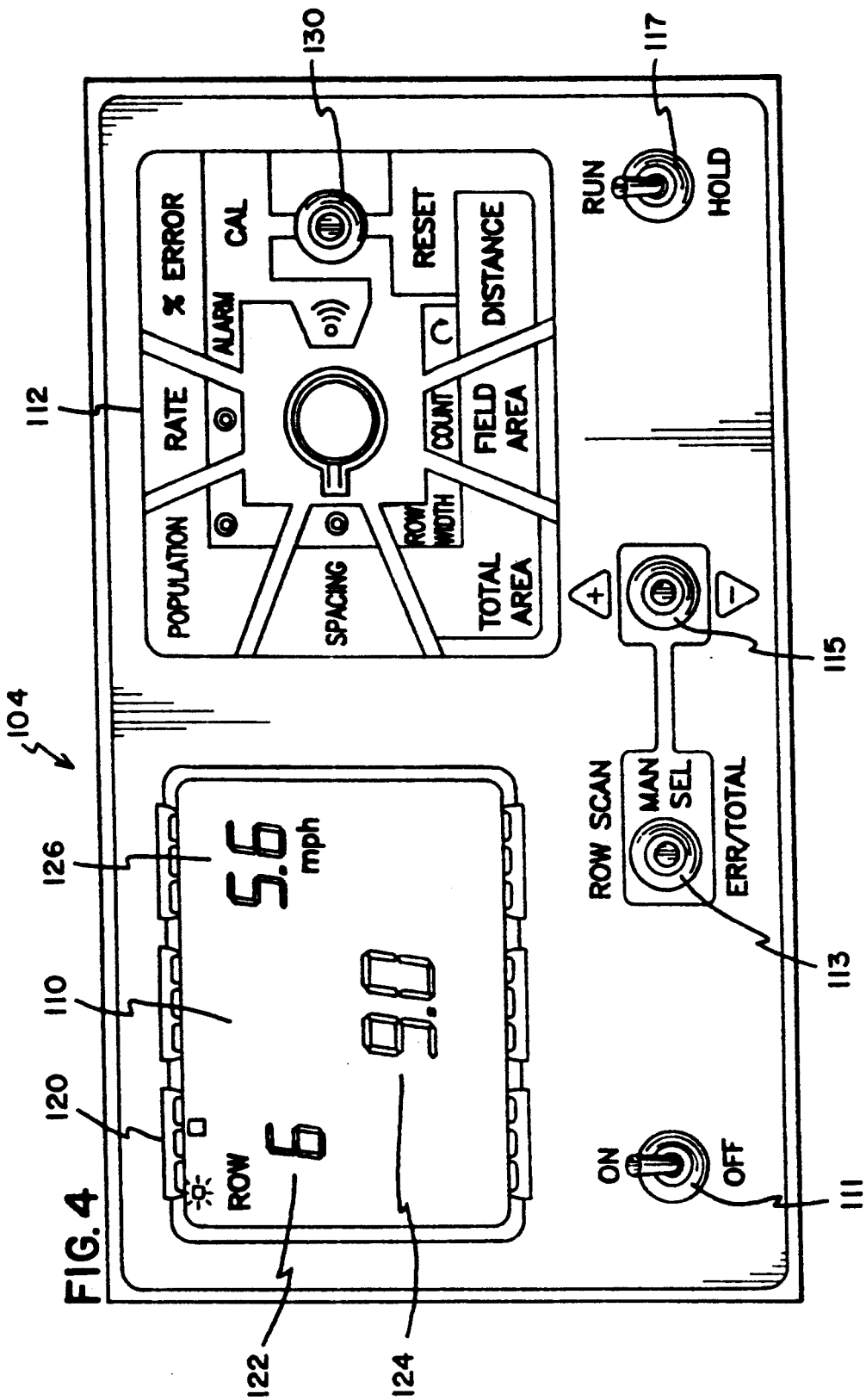
FIG. 4 shows the planter monitor system console.
Figure 5:
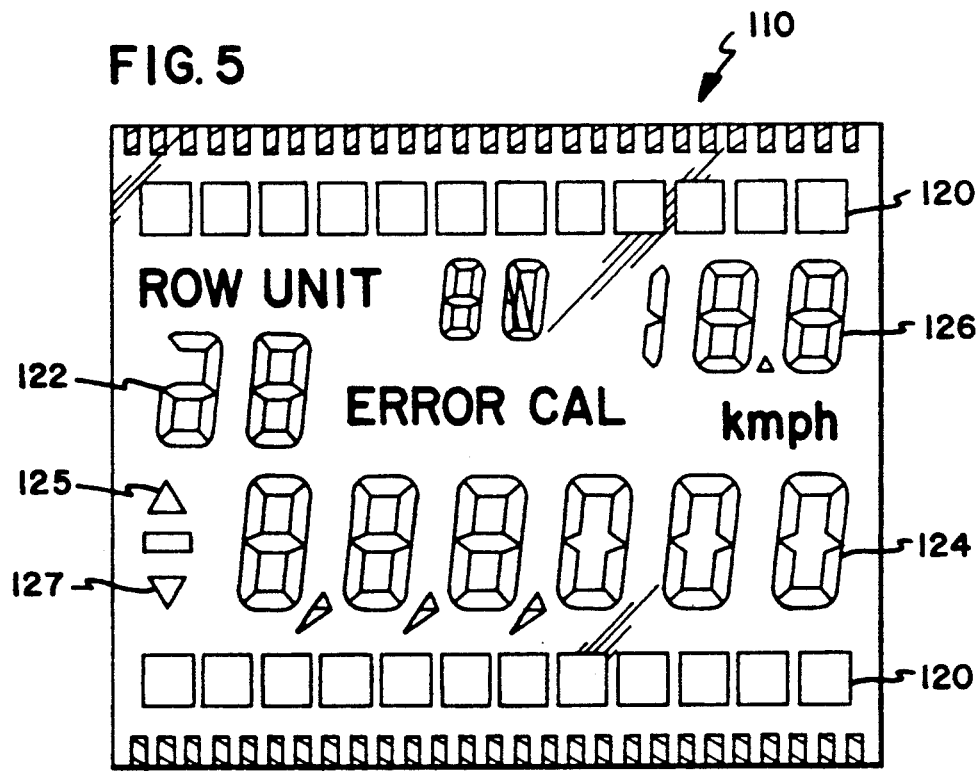
FIG. 5 shows detail of the LCD display.

FIG. 4 shows detail of console 104 and FIG. 5 shows detail of LCD display 110. LCD display 110 displays individual row/sensor data (preferably a total of twenty four sensors) along with a continuous readout for speed, and a readout for selected functional data various messages.

Row status bars 120 shown on FIGS. 4 and 5 indicate which working seed sensors detect planting rates which are not within calibrated limits predetermined by the operator. When the planter's performance falls out of the sensor's calibrated range, the appropriate row status bar 120 corresponding to that row will be activated. The status bars are preferably assigned in order, from left to right, beginning with sensor/row number one in the upper left corner of LCD and ending with sensor/row number 24 (or other maximum row number) in the lower right of LCD display. A flashing indicator is used to show that actual planting rate of that particular row is higher than the target rate. A solid indicator is used to show that actual planting rate of that particular row is lower than the target rate. For example, FIG. 4 shows a flashing status bar for row 1, indicating that row 1 is over planting. The solid status bar shown for row 3 indicates that row 3 is underplanting. A first alarm is activated simultaneously with the row status bars when planting rate errors are detected. Preferably, the alarm will sound once when the error is detected and not sound again until another error is detected. The row status bar remains illuminated for as long as the error is present.

FIGS. 4 and 5 show the speed readout 126 on LCD display 110. Planting speed is continuously displayed, preferably to the nearest tenth m.p.h. In FIG. 4, for example, the displayed speed is 5.6 m.p.h.

The six digit data readout 124 on LCD display 110 is used for displaying data pertaining to any of the eight operator selectable functions chosen via multiposition selector switch 112. During operation, this readout displays specific data for percent error, population, spacing, total area, field area, distance, and alarm volume. In FIG. 4, for example, the selected function is "SPACING" and the corresponding readout is "9.0" on the LCD display, meaning the planted spacing between seeds is 9 inches/seed (if English units).

Row indicator 122 displays the row number for which performance data is currently being displayed. Planting data associated with that row is displayed by six digit data readout 124. FIG. 4 shows that performance data for row 6 is currently being displayed.

The preferred embodiment of the present invention also indicates when the row with the highest or lowest planting rate is being displayed. When data for the row with the highest planting rate is displayed, an upward pointing arrow 125 is displayed to the left of six digit data readout 124, as shown in FIG. 5. A flashing up-arrow is shown next to the row having the second highest planting rate. Similarly, a downward pointing arrow 127 is shown next to the data for the row with the lowest planting rate, also as shown in FIG. 5, and a flashing down-arrow is shown for the row with the second lowest planting rate.

In addition to displaying performance information for one row at a time, the preferred embodiment of the present invention also allows the operator to view averaged data over all rows. In that case, six digit data readout 124 displays total information for all rows being planted. The data displayed correlates directly with the operator selected function of multiposition selector switch 112.

Multiposition selector switch 112 shown in FIG. 4 is used by the operator to select which of the eight available functions will be displayed in the six digit data readout of the LCD display. To select a function, the operator simply turns the selector switch to point to the desired function. These functions are described as follows:

Alarm Volume: With selector switch 112 set to the three o'clock position, the audible alarm is activated for testing purposes. In this position, alarm 1 will sound for one half second at one second intervals. If alarm 1 is not set to a desirable level, the volume using "+/−" toggle switch 115 as shown in FIG. 1.

Distance/Field Area/Total Area: Setting the selector switch 112 to DISTANCE will display the distance traveled in feet since the counter was last reset. The FIELD AREA and TOTAL AREA positions on selector switch 112 are independent acre counters. Selecting one of these positions will display acres accumulated since the counter was last reset. The area counters may be reset individually.

Distance Display
Metric Units: xx,xxx meters
English Units: xx,xxx feet
Field Area Display
Metric Units: xxxx hectares
English Units: xxxx acres
Total Area Display
Metric Units: xxxx hectares English Units: xxxx acres It shall be understood that the terms seed rate, population, and spacing all interrelated and that each can be derived by knowing the value of one of the others. Spacing/Population/Rate: These three positions on the selector switch 112 will display planting information pertaining to SPACING (inches between seeds), POPULATION (seeds per acre) and RATE (seeds per foot). Data is displayed in the six digit readout of the LCD. All data for these three positions correlate with one another.

Seed Population
Metric Units: xxx,x00 seeds/hectare
English Units: xxx,x00 seeds/acre
Seed Spacing
Metric Units: xx.x centimeters/seed
English Units: xx. x inches / seed
Seed Rate
Metric Units: x. xx seeds/meter
English Units: x. xx seeds/foot Percent Error: This position displays the percent deviation of the actual planting rate from the target or optimal planting rate. Error limit parameters may be set in calibration from one to seventy-five percent. Count: This position tells the console what type of seed counting method will be used. The operator may choose from one of four sensor correction conditions when the rotary selector is in this position.

By using the "+/−" switch, the four options for seed sensor correction can be viewed on LCD display. Setting one is the singulate mode. This is a common mode for low seed rate planting conditions where seeds are seldom bunched together. A typical planting operation would be a properly adjusted potato planter operating at its recommended speed. Setting two is the cup mode. This mode is used for high seed rate applications on planters which dump cups of seeds into the planting furrow. A separate setting is required on such planters because more than one seed might pass through the seed sensor at a time, affecting the monitored seed count as will be described below.

Width: With the rotary selector switch clockwise to ROW WIDTH, a number will be displayed on the console LCD display representing distance between rows in inches (or meters if in metric units).

To adjust the number to the desired row width, toggle the CMR switch from CAL to the middle position and back to CAL. The display will now show the number along with two flashing arrows pointing up and down.

Using the "+/−" switch, adjust the number displayed to the desired row width in inches.

Referring again to FIG. 4, console 104 also includes toggle switches 111, 113, 115, 117 and 130 which perform various independent and multi-functional operations:

On/Off Switch: Two position ON/OFF toggle switch 111, located in the lower left corner of the console, controls all 12 Vdc power to the system. No current is drawn from the battery when the switch is in the OFF position. Console 112 is equipped with a non-volatile memory chip to retain all calibration and area/distance information even when power is not being supplied to the system.

Cal/Mode/Reset Switch: CAL/MODE/RESET (CMR) switch 130 is in the preferred embodiment a three position, spring return to center (MODE) from bottom (RESET) toggle switch. In the up (CAL) position, functions associated with the inner ring of function symbols (e.g., alarm, row width, count, etc. ) are selectable with the selector switch 112. In the middle (MODE) position, functions associated with the outer ring of function symbols (e.g., % error, rate, population, spacing, total area, field area and distance, etc. ) are selectable with selector switch 112. During normal planting operation, the CMR switch should be in the middle (MODE) position.

Resetting the TOTAL AREA, FIELD AREA and DISTANCE counters is also done with the CMR switch. The desired counter to be cleared is selected via selector switch 112 while the CMR switch is in the middle (MODE) position. Holding the CMR switch to the bottom (RESET) position for approximately three seconds, the selected counter should be reset instantly to zero.

Figure 6:
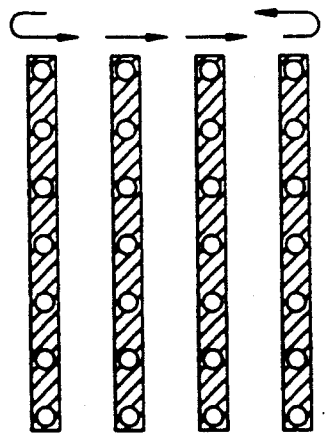
FIGS. 6, 7 and 8 show three different monitoring modes by which the present invention scans the rows to monitor the performance of a mobile planting apparatus.
Figure 7:
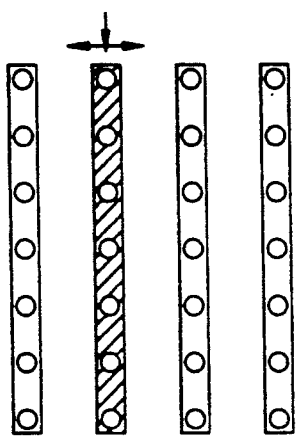
Figure 8:
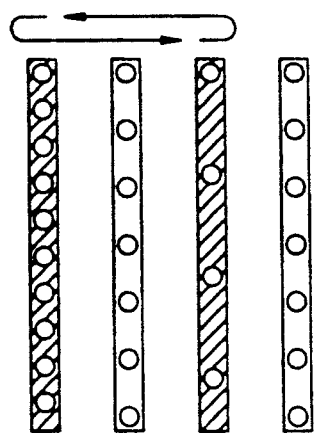

FIGS. 6, 7 and 8 show diagrams of the three different ways in which the preferred embodiment of the present invention is able to scan the rows being planted for performance data. The desired scanning method selected via ROW SCAN, MAN SEL, and ERR/TOTAL toggle switch 113. This three position toggle switch is used to control row selection when displaying planting functions. The functions that will be displayed in conjunction with this switch are PERCENT ERROR, RATE, POPULATION and SPACING.

ROW SCAN is a sequential row scan shown in FIG. 6. In the ROW SCAN (up) position, the display will sequence every few seconds through each working sensor, automatically, displaying planting data for each row on the LCD display. The upper left readout will display the row number and the six digit readout will display the row data associated with the operator selected position of the selector switch. When the console is in the ROW SCAN mode it will also show a total for the entire planter, after the last row is scanned. During the display of the total planter data the upper left display will not show a row number.

MAN SEL (manual select) scan is shown in FIG. 7. Placing the switch in the MAN SEL (middle) position stops the automatic sequencing and allows the operator to select individual row data using the "+/−" switch. The upper left readout will display which row is being monitored. The six digit data readout will display the associated planting data. The selected row or planter total will be monitored and displayed continuously until the operator selects another row or the three position toggle switch is moved to a different position.

ERR/TOTAL scan, shown in FIG. 8, is an error total row scan. Selecting the ERR TOTAL (bottom) position causes the console to automatically scan and display for the operator ONLY those rows out of operator defined tolerances. The operator enters data such as a target, or optimal seed rate (or population or spacing), and also an acceptable percentage deviation from the target value. If a row is determined to be outside of the accepted deviation from the target, those rows will be displayed in ERR/TOTAL scan mode. It will also display total planting data while scanning. The upper left readout will indicate which row data is being displayed. When total planting data is being displayed, no row number will be displayed.

The two position RUN/HOLD toggle switch 117 activates and disables the accumulation of the area and distance counters when the planter is raised. In the preferred embodiment a magnet is attached to a lever or some part of the planter equipment that moves when the planter is raised or lowered. The area and distance counters will only accumulate when the RUN/HOLD switch is in the RUN (up) position and the remote sensor must detect a magnet for proper operation and accumulation of area and distance totals to occur.

DETAILED ELECTRONIC DESIGN

A detailed description of the electronic design of the planter monitor system of the present invention follows.

ELECTRICAL BLOCK DIAGRAMS

Figure 9:
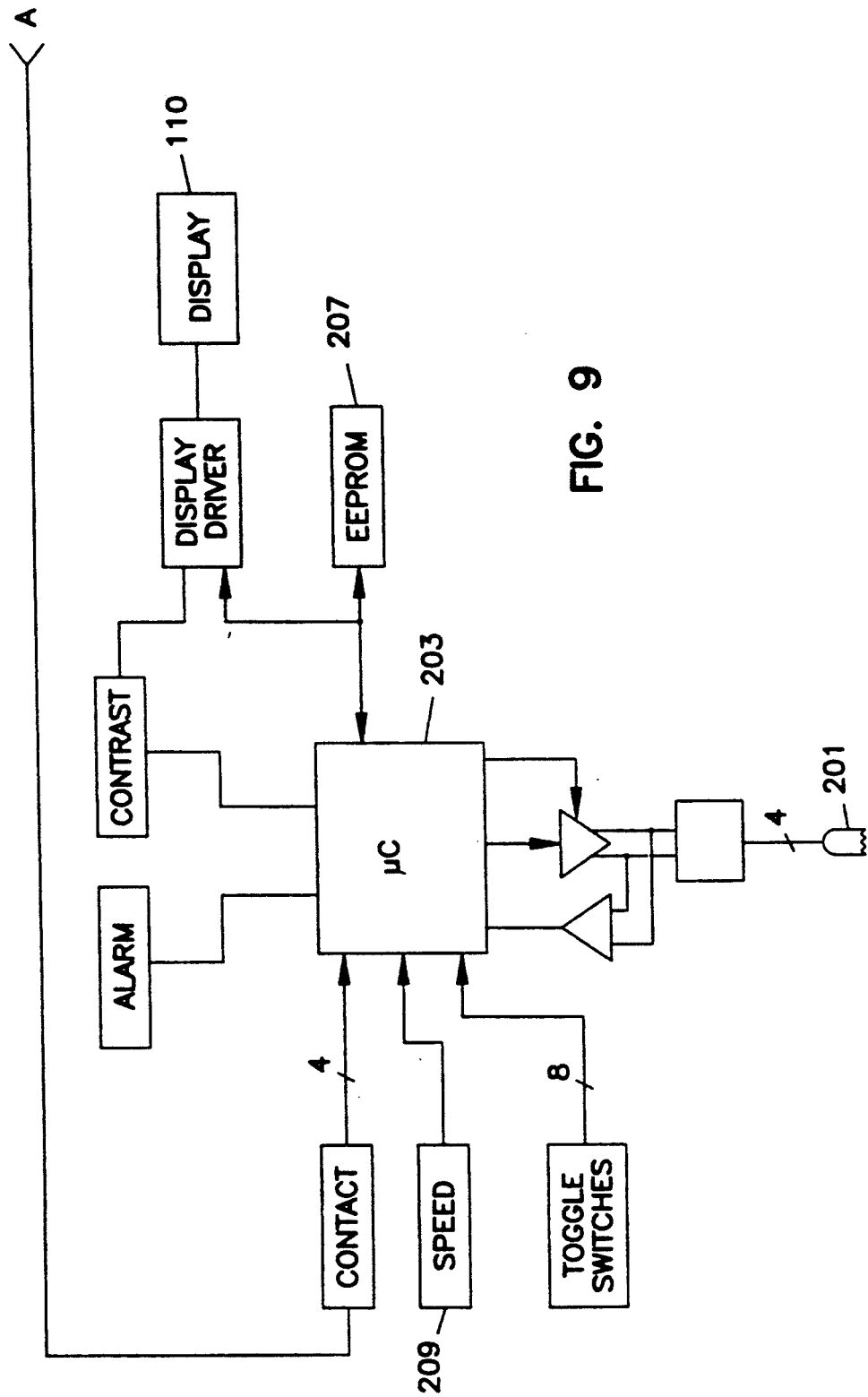
FIGS. 9 and 10, when side by side, show a block diagram of the planter monitor system of the present invention.
Figure 10:
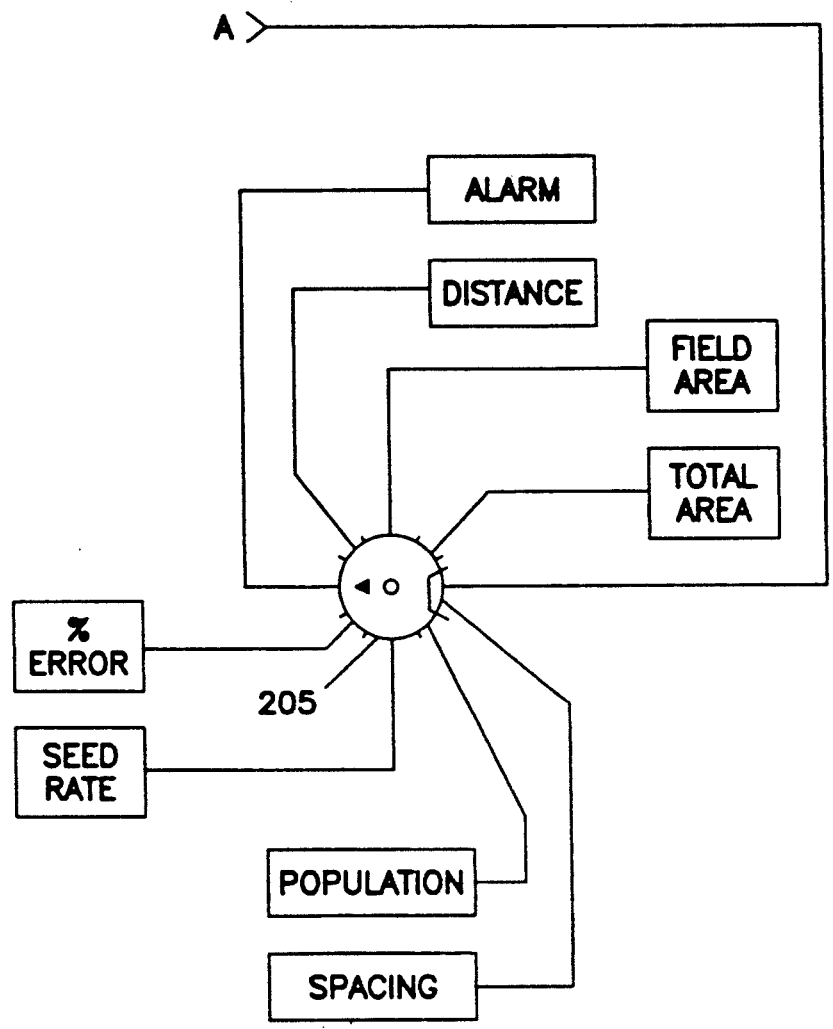

FIGS. 9 and 10, when side by side, are a block diagram of the console unit of the preferred embodiment of the present invention. Microcontroller 203 controls the system by means of a software control program described below. The microcontroller contains integral RAM and ROM memory in which the control flow program and data are stored. The microcontroller receives input from the user through multiposition selector switch 112 and toggle shown in FIG. 1. Microcontroller 203 also communicates information to the user through display 110. A non-volatile electrically erasable programmable read only memory (EEPROM) 207 is used for long-term memory backup when the power is removed from the unit. A speed sensor 209 is required for use with the microcontroller to determine the speed of the planter. A wide variety of speed sensing devices may be used with the present invention including a radar unit, an ultrasonic doppler unit or a wheel sensor. The microcontroller 203 communicates with the microcontroller 303 of the row unit shown in FIG. 11 via a bi-directional serial communication bus 201.

Figure 11:
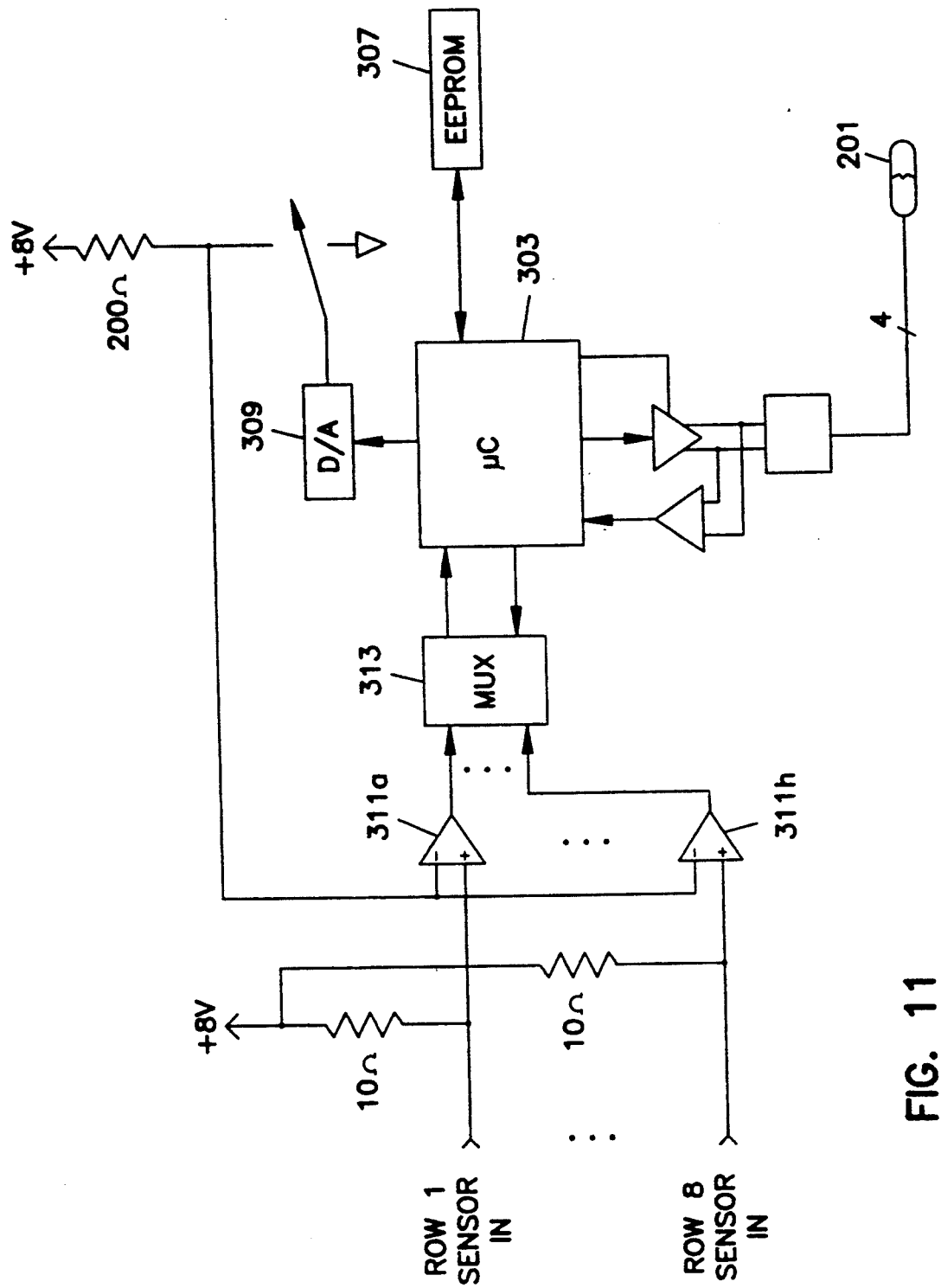
FIG. 11 is a more detailed block diagram of the planter monitor system of the present invention.

FIG. 11 shows an electrical block diagram of the row unit and its connection to the seed sensors. Microcontroller 303 in the preferred embodiment is the same type of controller used in the console unit shown in FIG. 10. This microcontroller also is connected to an EEPROM 307 which is used for nonvolatile memory backup. A digital-to-analog (D/A) converter 309 is connected to microcontroller 303 to provide a voltage threshold for comparators 311A through 311H to determine the presence o f a seed in the seed sensors (not shown in FIG. 11). The D/A converter sets the threshold during the calibration or setup time. The microcontroller 303 of FIG. 11 can poll the seed sensors through multiplexer 313.

ELECTRICAL SCHEMATIC DIAGRAMS

Figure 12A:
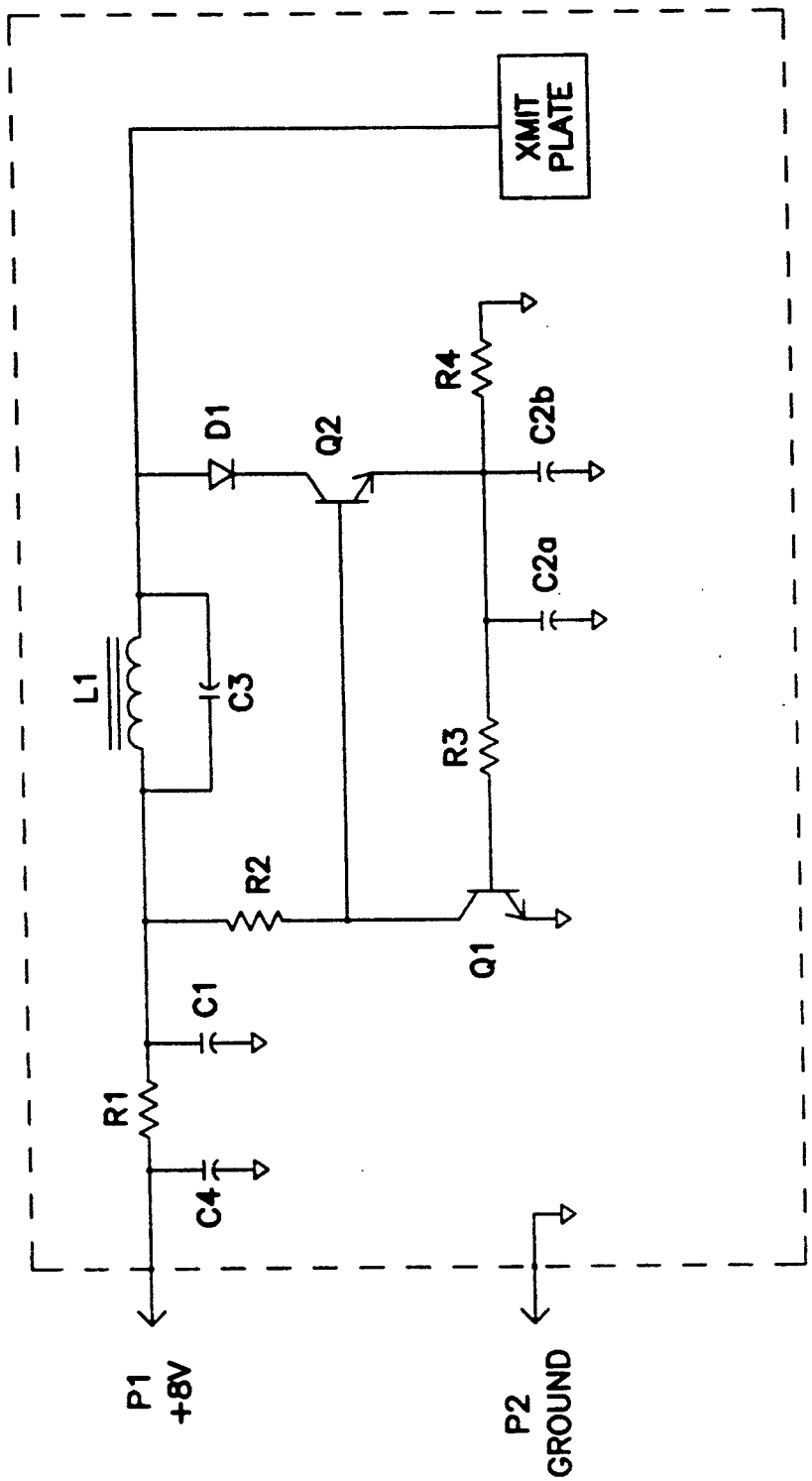
FIG. 12A-12B is a detailed schematic diagram of the seed sensor transmit/receive circuit of the present invention.
Figure 12B:
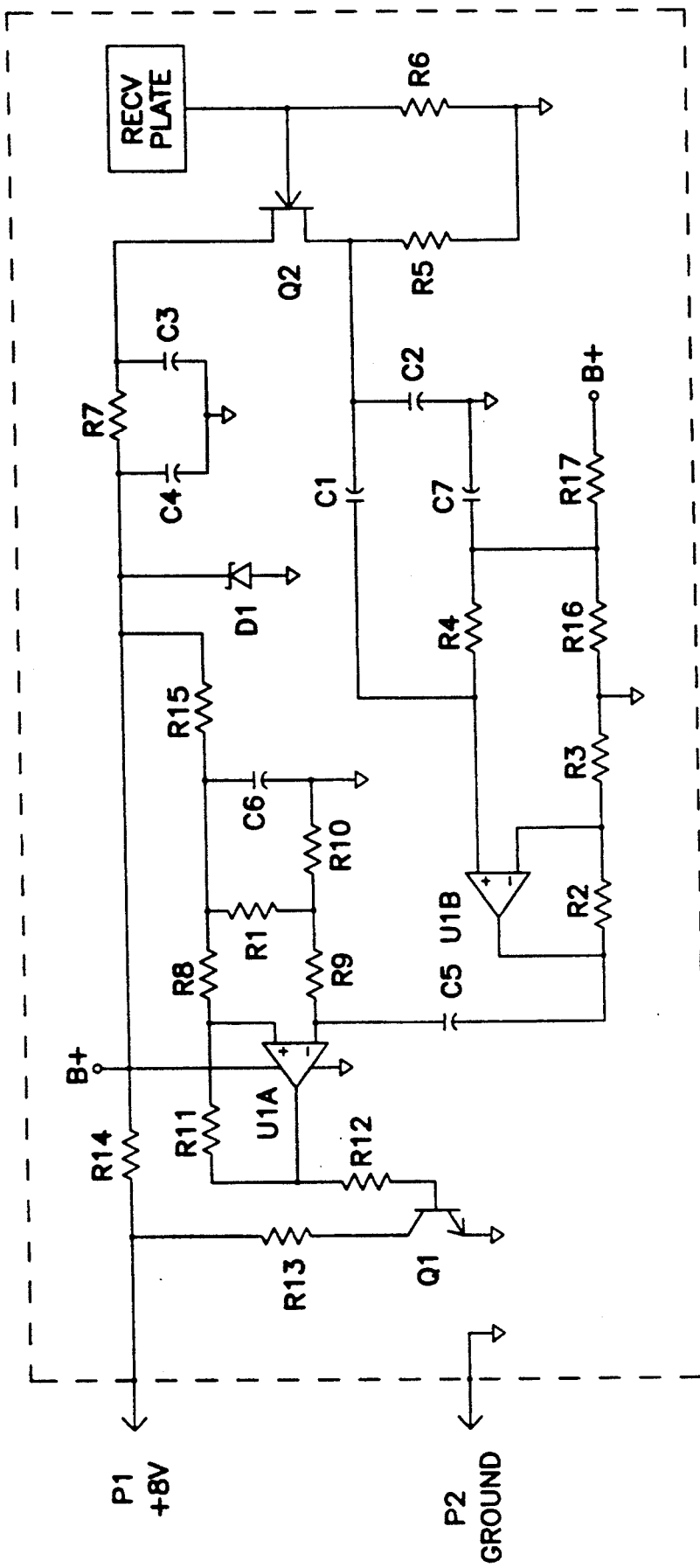

FIG. 12 is a detailed electrical schematic diagram of a seed sensor used in the preferred embodiment of the present invention. A small seed sensor (as shown in FIG. 3) is placed at each seed drop point on the planter to sense the seeds as they are dropped into the furrow. A plurality of seed sensors is connected to the row unit as described above. To minimize the number of wires connecting from seed sensors to the row unit, each seed sensor is in the preferred embodiment connected only by two wires: +8 volt power and ground. A seed sense signal is imposed on the +8 V voltage supply line shown as P1 in FIG. 12. The row unit then senses this signal on the voltage supply line without the need for additional interconnect wires.

Referring to FIG. 12, each small seed sensor is comprised of a transmit and a receive circuit. An oscillating electric field is placed between a transmit plate and a receive plate through which a seed drops. The disturbance of the electric field between the transmit and receive plates is sensed by the receive circuit and a small change in the current draw of the receive circuit indicates to the row unit that a seed was sensed. This change in current draw, on the order of a few milliamps, is enough to be sensed by the row unit as will be described in more detail below.

The transmit circuit of FIG. 12 sets up an oscillating electric field between the transmit plate and the receive plate. The receive plate is connected to ground through resistor R6. MOSFET transistor Q2 has its gate connected to the receive plate. MOSFET transistor Q2 has an extremely high input impedance to the gate which allows sensing the change in the electric field between the transmit and receive plates without introducing any appreciable additional impedance into the circuit.

The change in the electric field between the transmit and the receive plate caused by a seed dropping therethrough is sensed, filtered and amplified by the receive circuit through operational amplifiers U1A and U1B. As shown in the electrical schematic diagram of FIG. 12, the output of operational amplifier U1A drives the base of transistor bipolar NPN Q1 which, when ON, causes an additional current drain on the 8 volt supply line through resistor R13. This minimal change in current draw is then sensed by the row unit as an indication of a seed present between the transmit and receive plates of the small seed sensor shown in FIG. 12.

Detailed electrical schematic diagrams of the row unit used in the preferred embodiment of the present invention are shown in FIGS. 13 through 17. As described above, the row unit can control up to eight seed sensors and provides information from the seed sensors to the console over a two-wire serial bidirectional communication path. The connection between the console and the row unit is in the preferred embodiment comprised of only four wires: two for power and ground and two for bidirectional serial communication.

The heart of the row unit is an 8032 microcontroller available from INTEL and other microprocessor and microcontroller vendors. The 8032 microcontroller is a standard, off-the-shelf component available from many vendors. The 8032 microcontroller is shown as chip U4 in FIG. 13. The 8032 microcontroller contains 256. bytes of on-chip data RAM and 8 Kbytes of on-chip program ROM. A standard data and address bus configuration is shown connecting the 8032 microcontroller to a 32 Kbyte EPROM chip U8. Due to the multiplexing of the data and address lines on the low order bits (bits 00–07), a data address latch U5 is required to perform the data/addressing multiplexing. Those skilled in the art will readily recognize that a wide variety of microprocessor, microcomputer or microcontroller circuits could be used with the present invention without departing from the spirit and scope of the claimed invention.

Figure 13:
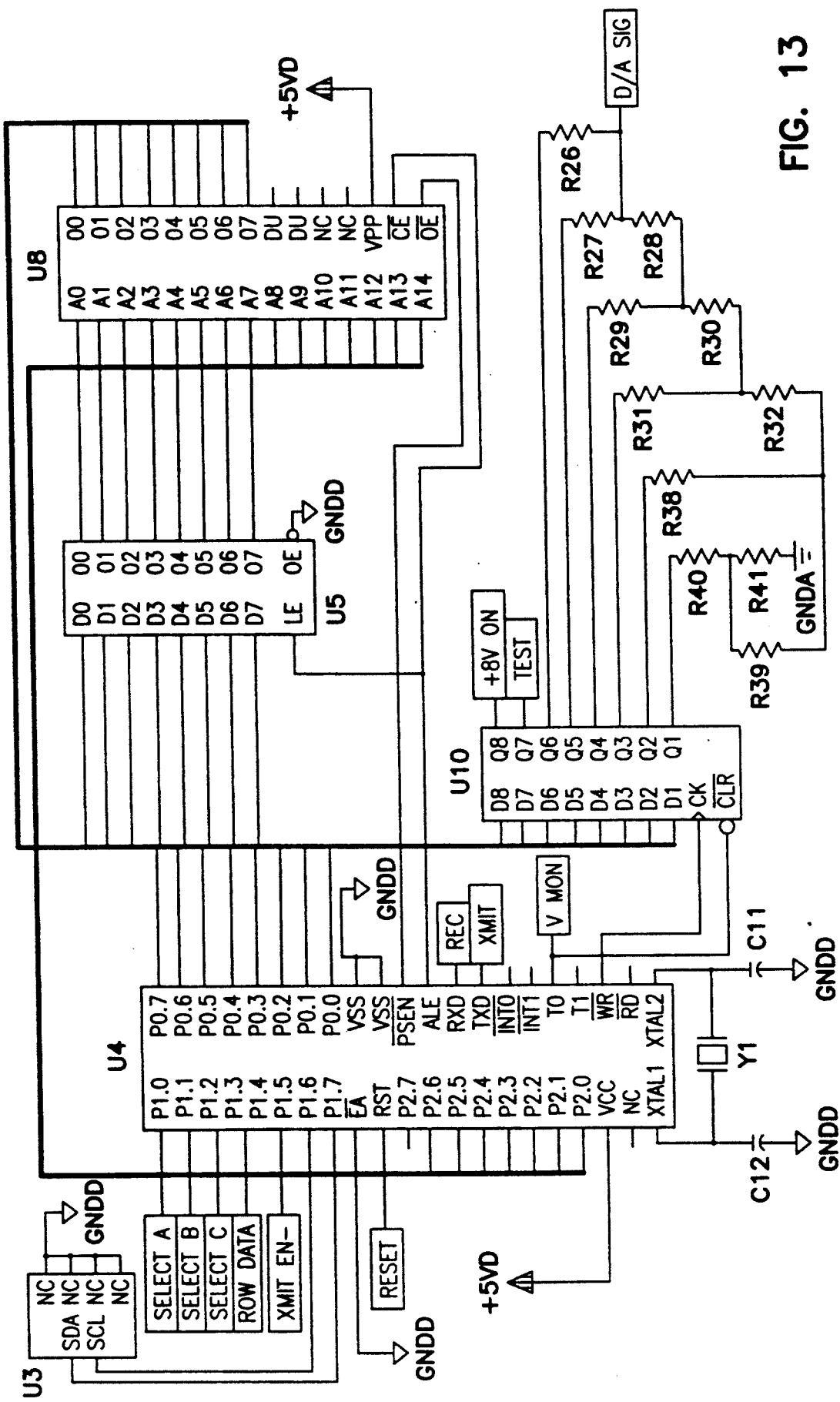
FIGS. 13-17 are a detailed schematic diagram of the row unit module of the present invention.

Also shown in FIG. 13 is a non-volatile ROM chip U3 which is used to store all critical memory from microcontroller 8032 upon power down. When sensing a low voltage condition on the power supply for the 8032 microcontroller, Electrically Erasable Programmable Read-Only Memory (EEPROM) chip U3 receives serial data over the SDA and SCL differential lines of the I²C serial communications bus interface to store the critical data. In the preferred embodiment of the present invention, EEPROM U3 is part number X24LC01 EEPROM available from Xicor®. This EEPROM is arranged as 128 bytes and is written serially. In this fashion the powering down of the row unit will not cause a loss of memory or data.

A Digital-to-Analog (D/A) converter is also shown in FIG. 13 constructed with octal latch chip U10 and a plurality of discrete resistors placed in a ladder configuration. As will be described below, the output of this discrete D/A converter is used as a reference voltage for determining thresholds in sensing outputs from the small seed sensors using comparators. Thus by addressing latch chip U10, microcontroller U4 can step through a series resistors to create various voltage values on the D/A signal output shown in FIG. 13.

Also connected to microcontroller U4 are the receive REC and transmit XMIT lines on pins 11 (RXD) and 13 (TXD). As will be described in more detail below, these signals comprise the bi-directional serial data interface to the console unit 104.

Figure 14:
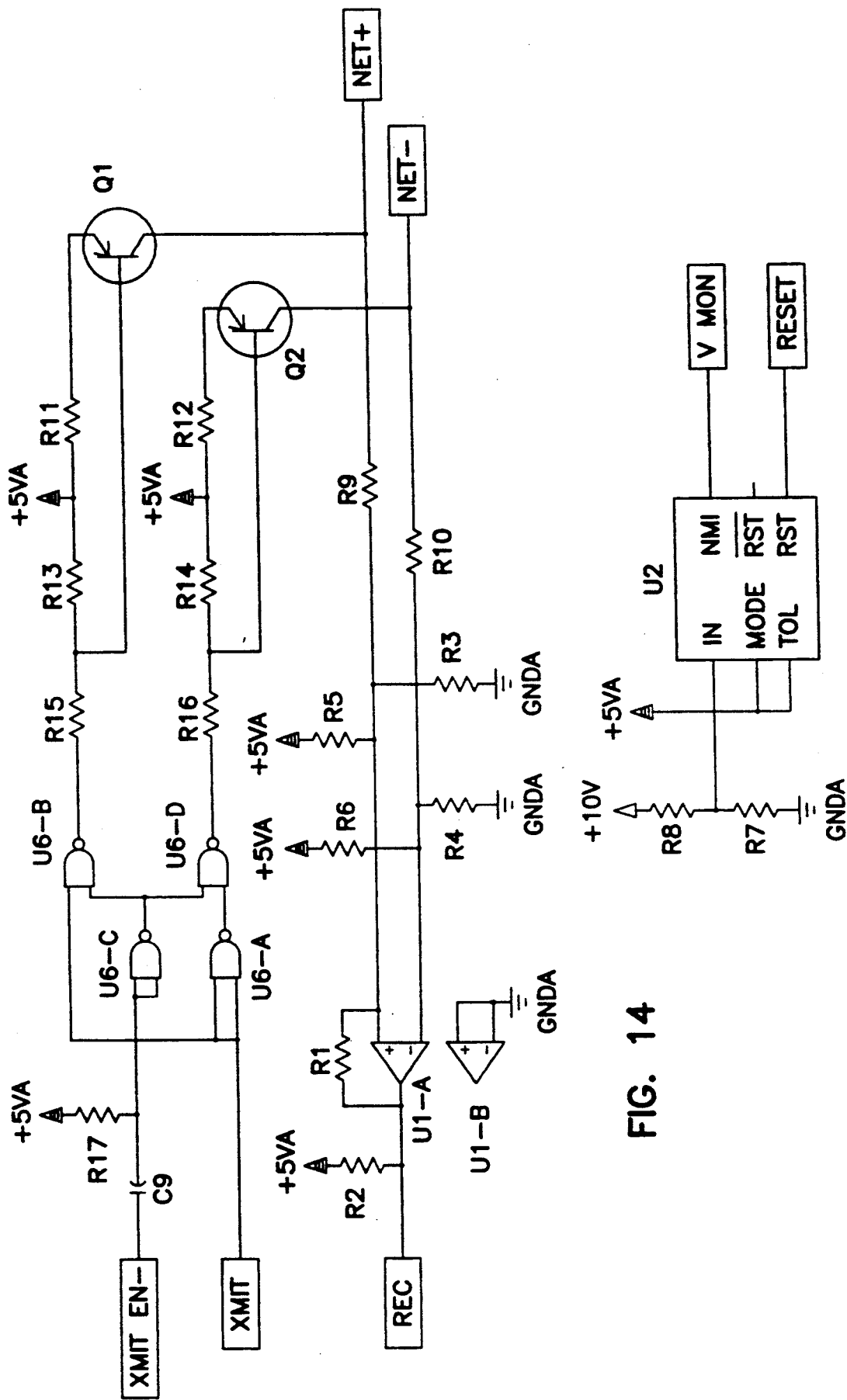

FIG. 14 is a detailed electrical schematic diagram showing the implementation of the bidirectional serial interface between the row unit and the console unit 104. The NET+ and NET− signal lines are the two communication lines of the four-wire wiring harness connecting the row unit to the console unit. The two lines NET+ and NET− transmit and receive serial data in a differential mode. Although bidirectional communication over the differential NET+ and NET− pair, only single direction communication is possible at a given time. Handshaking protocol is used to control the two-wire communication path so that contention and collisions are avoided.

Also shown in FIG. 14 is a low voltage monitor circuit which senses a drop in the supply voltage and triggers a power down interrupt on microcontroller U4 shown in FIG. 13. Upon a low voltage sensed condition, the microprocessor initiates an orderly shutdown by transmitting critical data to EEPROM chip U3 also shown in FIG. 13.

Figure 15:
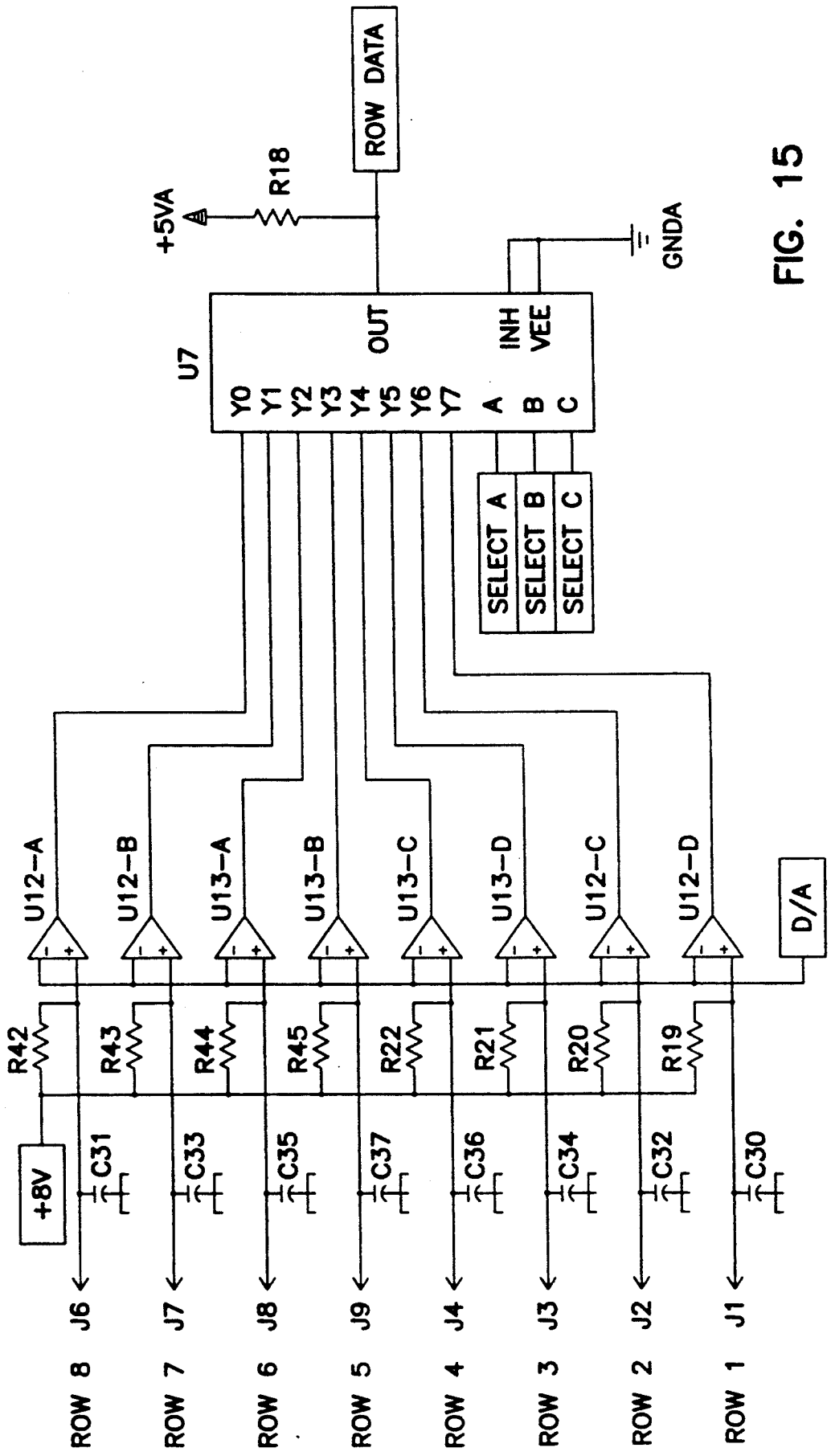

A plurality of connectors to eight seed sensors are shown in FIG. 15. The +8 V sense lines to/from each of the row units is driven into the non-inverting inputs of comparators U12A–U12D and U13A–U13D. These comparators are, in the preferred embodiment, part number LM2901 available from Motorola, National and other semiconductor vendors. All inverting inputs to the aforementioned current mode amplifiers are driven by the D/A threshold signal generated in FIG. 16 as described below. A change in the current draw by the seed sensors attached to the +8 V lines and the non-inverting inputs of the comparators will cause the output of the comparators to either go HIGH or LOW in response to the sense or non-sense of a seed by a seed sensor. The outputs of these comparators are driven into multiplexer chip U7 which is controlled by microcontroller U4 in FIG. 13. The select lines SELECT A, SELECT B and SELECT C from the microcontroller determine which of the row data are selected to be driven into the microcontroller for polling by the console unit.

Figure 16:
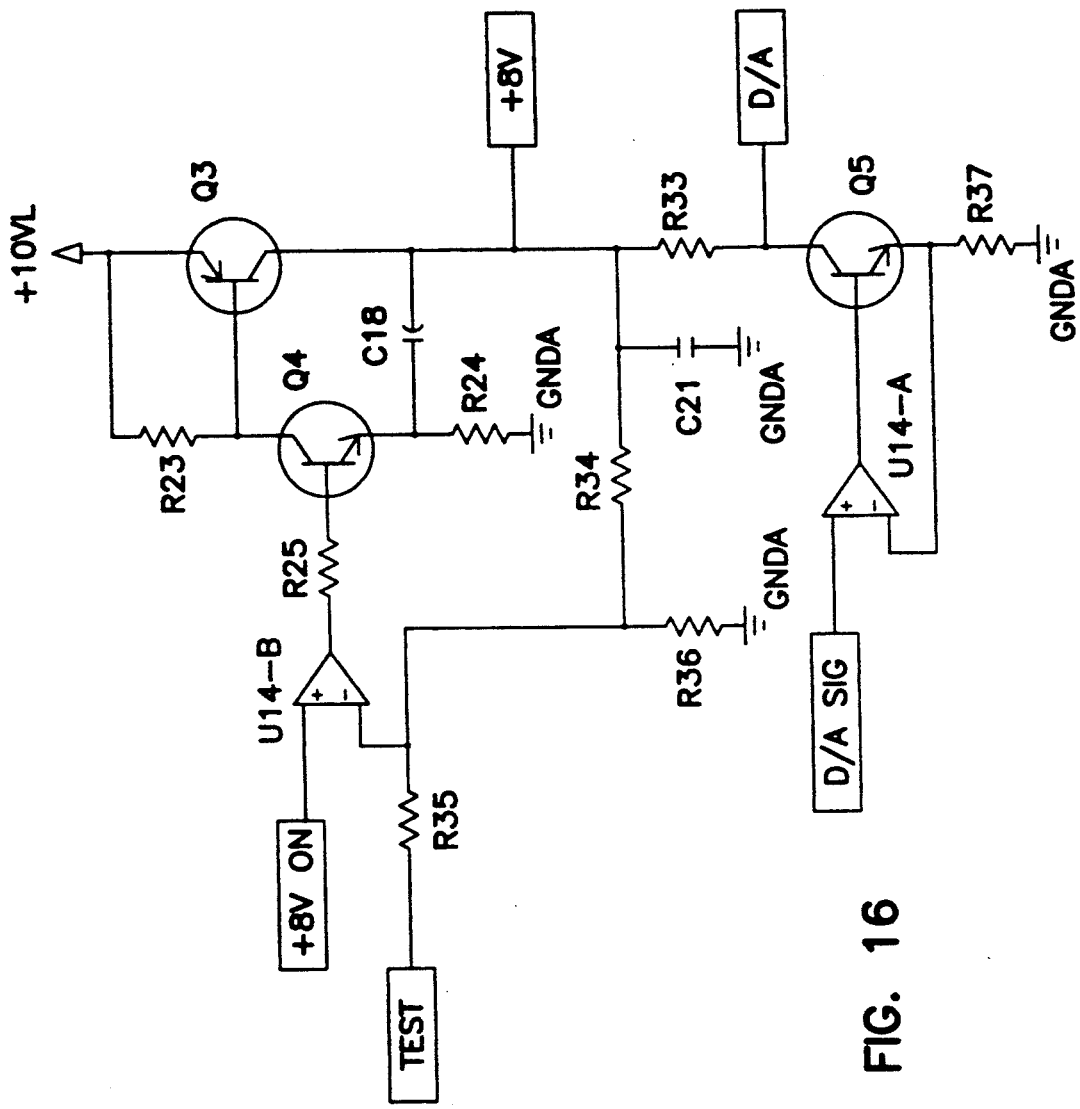

FIG. 16 is a detailed electrical schematic diagram showing the generation of the D/A reference signal in response to the D/A SIG signal generated by the D/A converter circuit shown in FIG. 13. Also shown on FIG. 16 is a TEST signal received from the microcontroller of FIG. 13 and a +8 V ON signal which are used to run calibration and diagnostics on the seed sensors. Setting the threshold by the microcontroller for the seed sensors can be done without have a seed passing through the seed sensor. Thus a seed and noseed condition is sensed as part of the calibration without actually dropping seeds through the seed sensing unit.

As shown in FIG. 16, the +8 V signal used to drive the small seed sensors and noninverting inputs to the comparators (see FIG. 15) and the D/A signal used to drive the inverting inputs to the comparators (see FIG. 15) are fixed to be a few millivolts apart as determined by the current flowing through precision resistor R33. Thus the D/A signal and the +8 V signal will track very closely.

A small change in current draw from a seed sensor on the +8 V power supply line will indicate the sensing of a seed. That small change in current will cause a millivolt level change in the +8 V signal line in response to a seed being sensed. This small change in the difference between the +8 V supply line and the D/A reference line will be sensed by the comparators in FIG. 15. Thus the comparators shown in FIG. 15 are sensitive to very minute changes in the current draw of the small seed sensors.

During calibration, the D/A SIG signal generated by the D/A circuit of FIG. 13 is used to set the D/A signal which is used as a reference to the comparators of FIG. 15. The microcontroller causes the D/A converter of FIG. 13 to step through all voltages between a low voltage and a high voltage. As the voltages are stepped up the microcontroller senses a change in the output of comparators on FIG. 15. When a voltage level on the D/A signal causes one of the comparators of FIG. 15 to toggle, that is the reference voltage threshold that will be used to determine a no condition seed for that seed sensor. Thus the voltage threshold is selected to be one voltage unit below that which triggered the comparators of FIG. 15 during calibration. This completes the noseed test for all eight sensors.

Also during calibration, a lower voltage threshold corresponding to a sensed seed is calibrated to test the seed condition of the sensors. During this calibration, the TEST line shown in FIG. 16 is turned OFF by the microcontroller which grounds the inverting input of operational amplifier U14B (part number LM2904 available from Motorola, National and others) shown in FIG. 16. The output of operational amplifier U14B serves to lower the +8 V line by a few millivolts. This lowering of the 8 volt line simulates a seed condition. Thus a noseed condition results in a higher voltage level on the +8 V line than the seed condition. This is because the seed sensor draws approximately 12 milliamps during a noseed condition and approximately 9 milliamps during a seed condition. This minute change in the current draw will cause a minute change in the +8 V voltage level sensed by the row unit.

Figure 17:
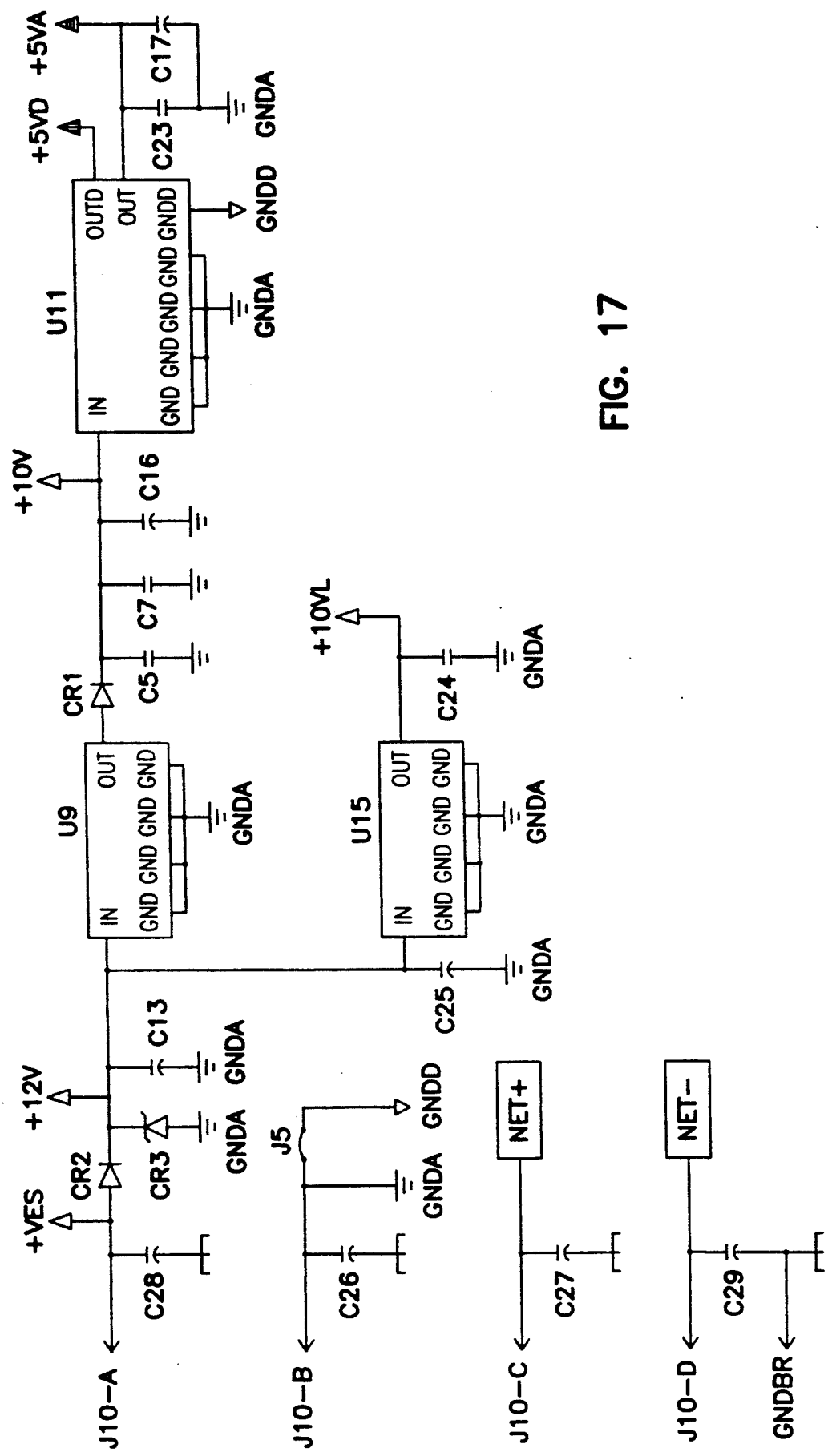

FIG. 17 describes the four wire interface for the wiring harness between the row unit and the console on the row unit side. The NET+ and NET− differential signals are the bidirectional serial communication lines 3 and 4 on connector J10. Pin 2 of connector J10 is the ground line and pin 1 of connector J10 is the voltage supply for the row unit and for the eith small seed sensors. Voltage regulators U9 and U15 are in the preferred embodiment 10 volt monolithic voltage regulators for producing 10 VDC regulated power. Voltage regulator U11 is a 5 volt DC monolithic voltage regulator for producing 5 VDC supply.

Figure 18A:
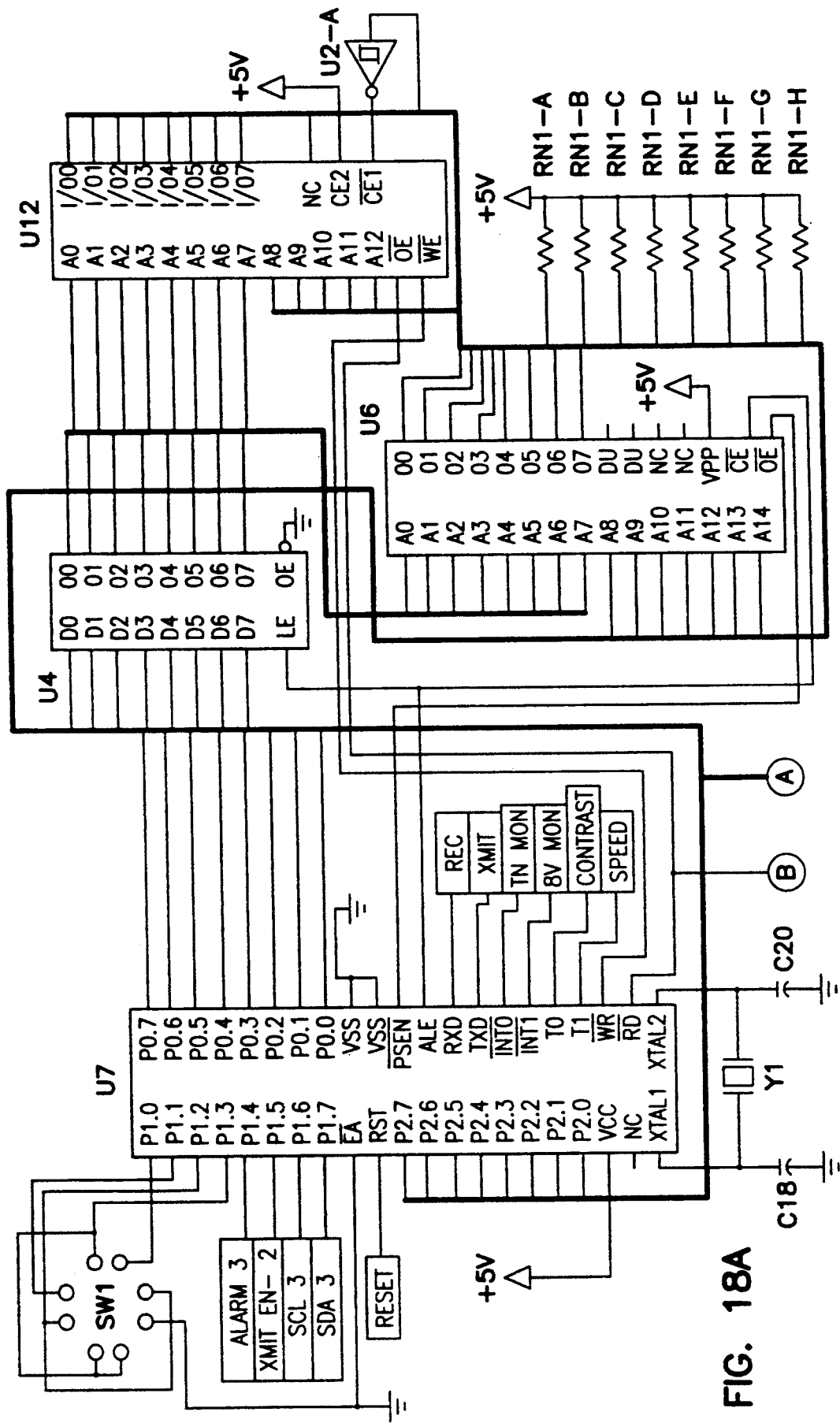
Figure 18B:
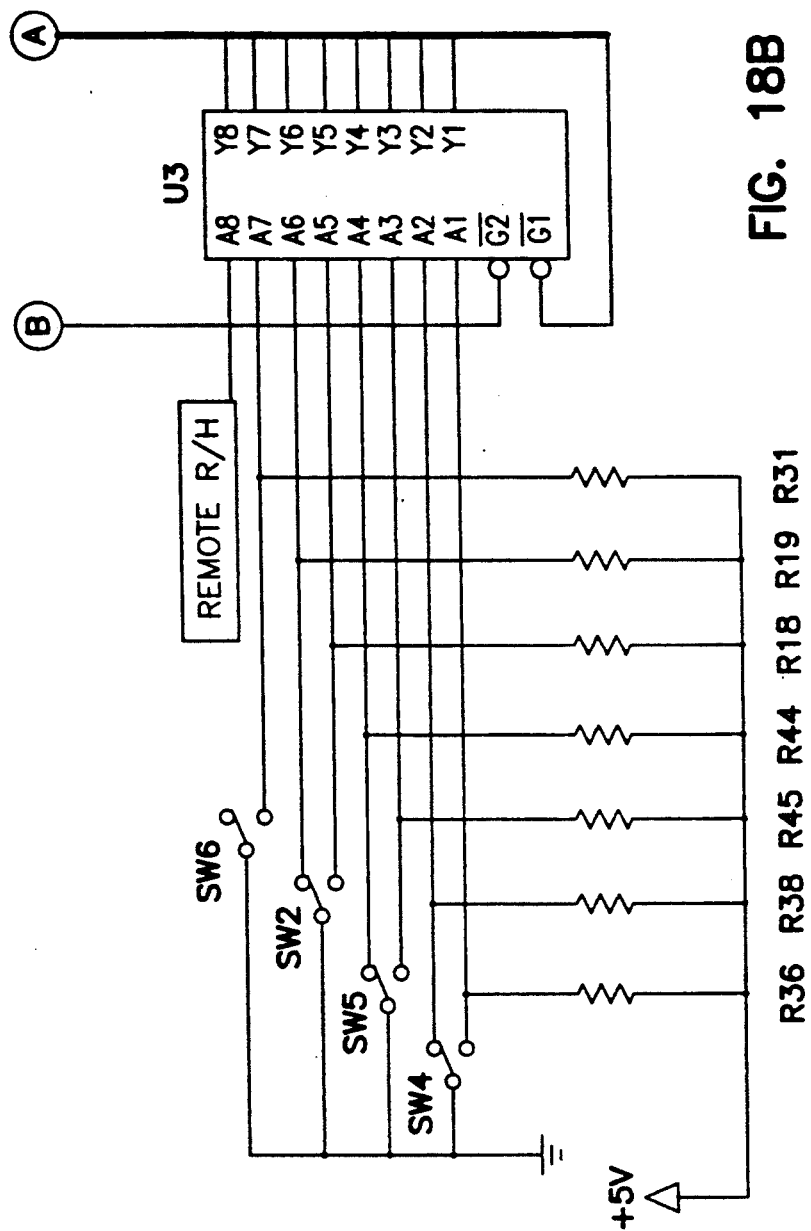
Figure 19A:
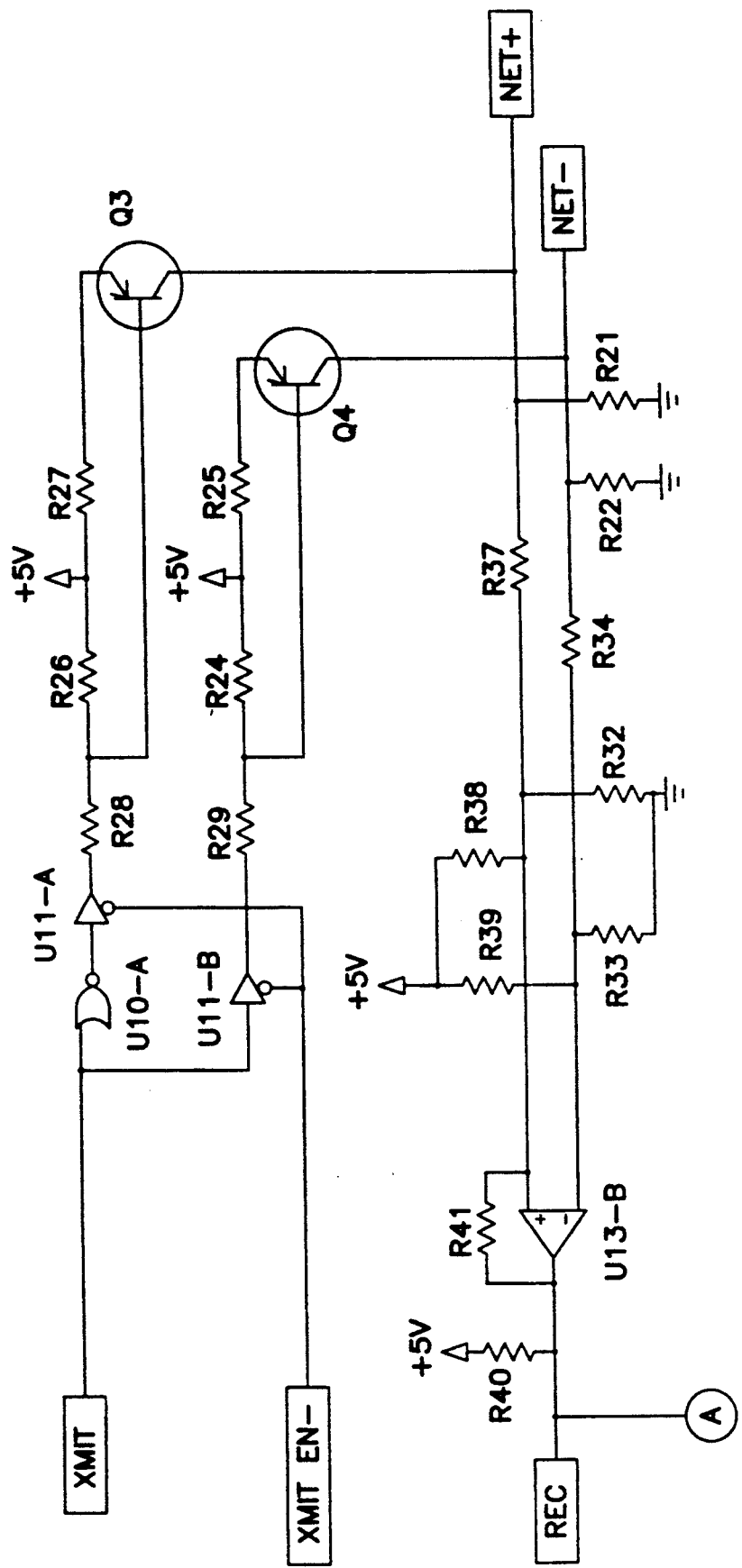
Figure 19B:
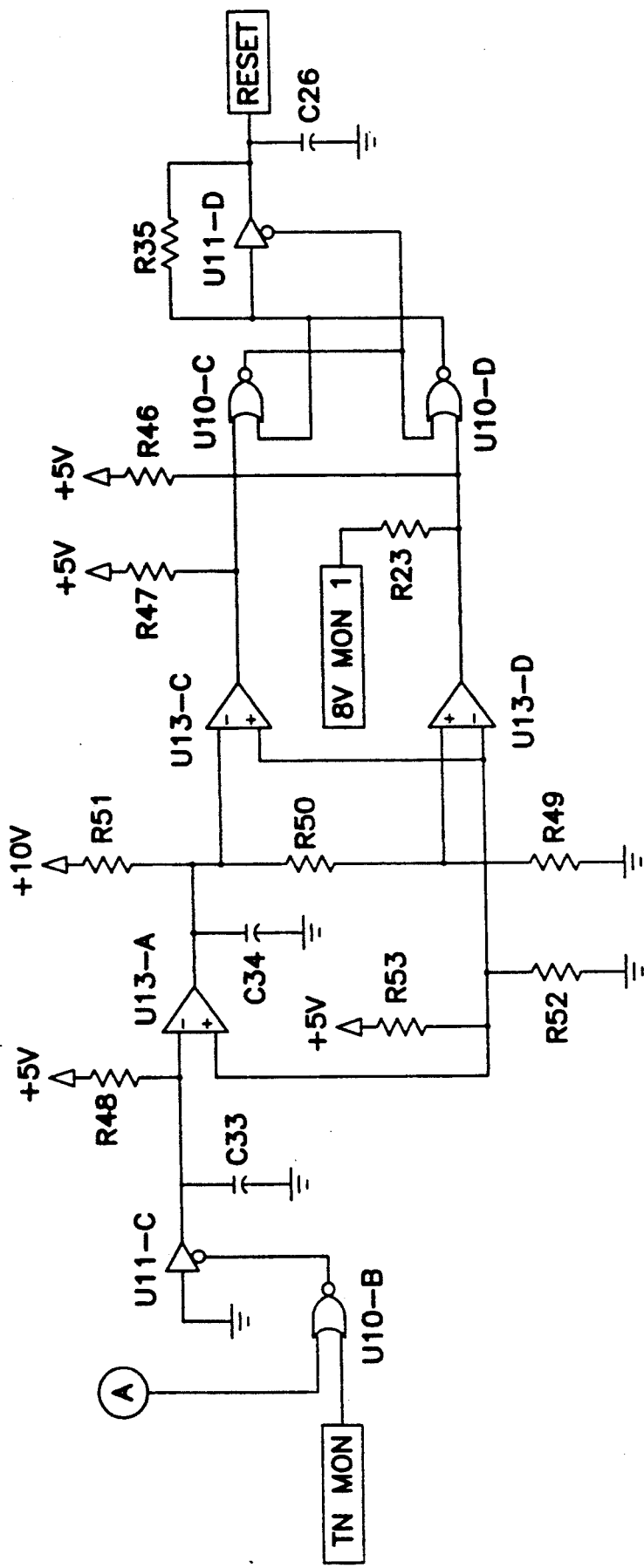

FIGS. 18–21 are detailed electrical schematic diagrams of the monitor console implemented in the preferred embodiment of the present invention. The heart of the console is also an INTEL 8032 microcontroller using a standard bus-structured architecture with a combined address and data bus for low ordered bits (see the description of FIG. 13 above). The heavy dark lines of FIG. 18 indicate bus lines. On microcontroller V7 of FIG. 18, the transmit XMIT and receive REC lines on pins 13 and 11, respectively, correspond to the transmit and receive signals connecting the console unit with the row unit described above. Also shown in FIG. 18 is EPROM memory chip V6, Dynamic Random Access Memory (DRAM) V12 and bus data/address latch V4 all configured in well known structures. Also shown in FIG. 18 are the console toggle switches for controlling the different modes of operation of the present invention. The console toggle switch positions are sensed and latched through latch chip U3 with the results being placed on the combined address and data bus for reading by microcontroller U7. A remote run/hold REMOTE R/H line is also sensed by microcontroller U7 for sensing a remote switch on a planter to stop counting operations when, for example, the planter is turning to a new row. The top half of FIG. 19 shows the bidirectional serial communications interface for connecting the microcontroller U7 of FIG. 18 to the bidirectional serial communications lines NET+ and NET−. The operation of this circuit is nearly identical to the operation of the circuits described in FIG. 14 above.

Also included in the lower half of FIG. 19 is a power-up reset and 8 volt voltage monitor sense circuit. The operation of this circuit corresponds to the operation of chip U2 in FIG. 14 described above. The function of the voltage sense circuit in the lower half of FIG. 19 is to sense a voltage shutdown condition which would be imminent during loss of power. In sensing a low voltage condition, the microcontroller can perform an orderly shutdown and off-load critical information from volatile RAM onto non-volatile RAM in chip U9 shown in FIG. 20. Chip U9 of FIG. 20 corresponds to chip U3 of FIG. 13 described above.

Figure 20C:
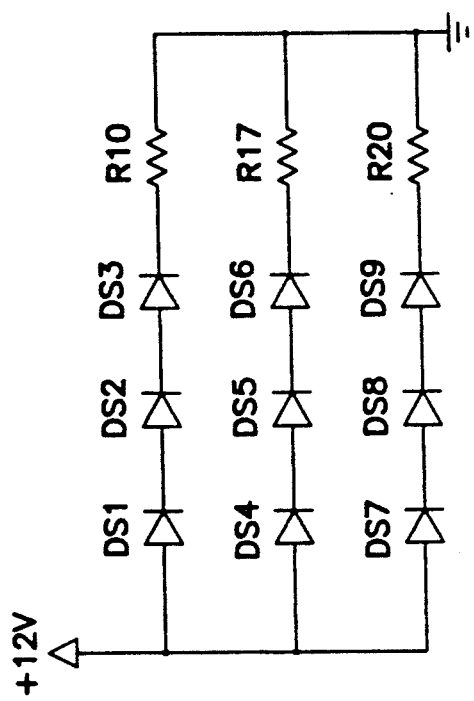

FIG. 20 shows the LCD display U8 and the LCD display controller chip U5. Data to be displayed on LCD display U8 is serially transmitted to chip U5 from microcontroller U7 of FIG. 18 via the I²C bus on lines SDA and SDL. Also connected to the same I²C bus is chip U9 which, as described above, is the serial EEPROM for non-volatile memory storage during power down conditions. Also shown in FIG. 20 are the backlighting diodes DS1–DS9 for the LCD display, and the contrast and alarm interface circuits.

Figure 21A:
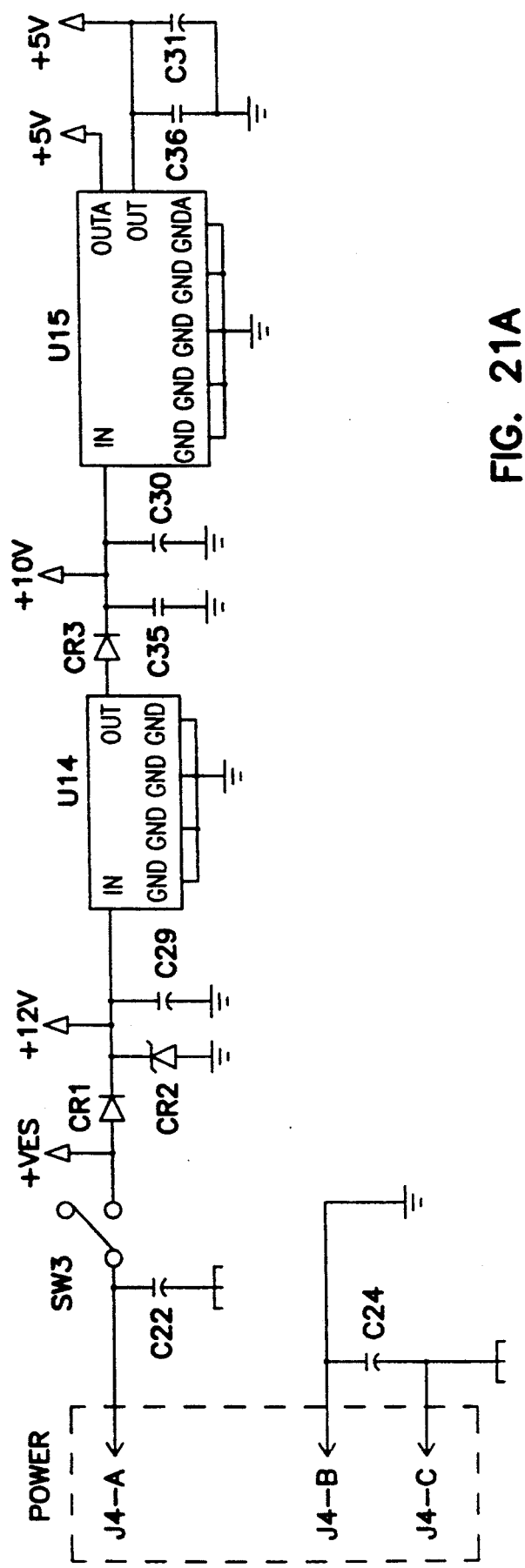

FIG. 21 shows the interface connectors for connecting the console unit. The power connector J4 provides 12 volt power from the tractor voltage system for running the entire monitor system. The 12 volt power is down regulated by monolithic regulators U14 and U15 for providing +10 VDC and +5 VDC respectively.

Connector J1 is a connector which interfaces the console unit to a speed sensor. The output of the speed sensor is a pulse train, the rate of which indicates the ground speed.

Connector J2 is a remote run/hold switch which could be mounted on the planter to indicate when the planter has been raised, for example, when turning at the end of a row.

Connector J3 is the serial I/O and power connection for the connection harness to the row unit.

CONTROL FLOW

A detailed description of the control flow of the planter monitor system will now be given.

The preferred embodiment of the present invention has the ability to accurately monitor both low seed rate applications (e.g. potatoes, corn) and high seed rate applications (e.g. soybeans). The operator chooses one of four seed counting methods, "SIN" "CUP" "SEED 3" and "SEED 4". The "SIN" seed count method, representing singulated, is chosen when planting low seed rates. The "CUP" seed count method is chosen for high seed rate applications. "SEED 3" and "SEED 4" seed count methods are also used for very high seed rate applications and allow the operator to configure the invention to specially fit a particular planter characteristic.

A seed graph is constructed at power up for the chosen seed count method. The seed graph represents the planter monitor system sensor characteristic. The seed graph is essentially a correction factor for high seed rates and is the means by which the planter monitor system of the present invention is able to maintain a high degree of accuracy even at very high seed rates.

Figure 22:
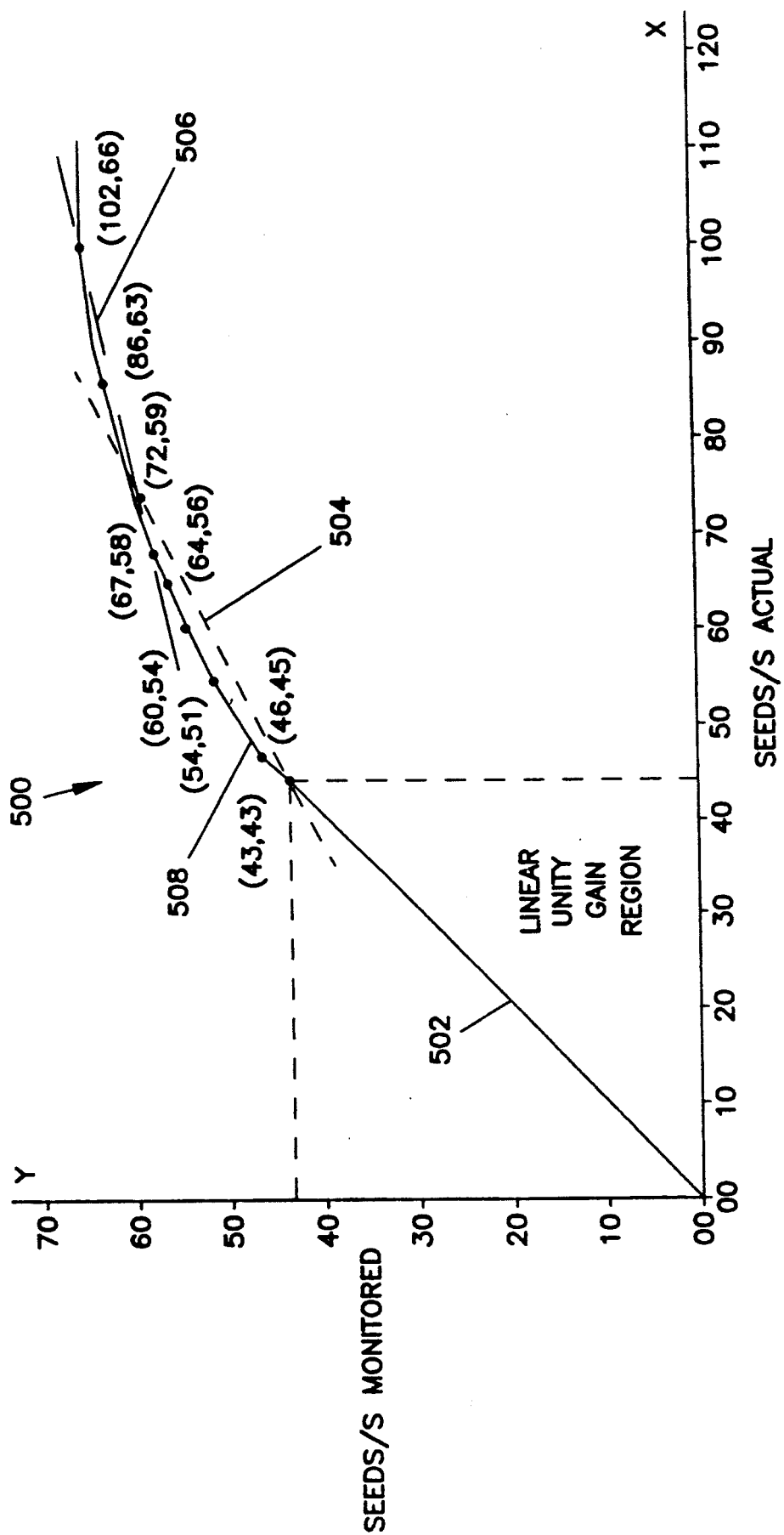
FIG. 22 shows a representative seed graph of the present invention.

FIG. 22 shows an exemplary seed graph. The seed graph is used by the control software to adjust the speed of the mobile planting apparatus to maintain the optimal seed distribution. Each seed graph is divided into either three portions (for "SIN" and "CUP" seed counting methods), or into two portions (for "SEED 3" and "SEED 4" counting methods). The A portion 502 is a linear unity gain region as shown on FIG. 22. In this region the seed sensors have the ability to accurately detect the number of seeds planted. For example, in the seed graph shown in FIG. 22, the particular planter is able to accurately count 43 seeds per second. The actual number of seeds per second is shown on the x-axis, while the monitored number of seeds per second is shown on the y-axis. Above the linear unity gain region, the ability of the seed sensors to accurately detect the actual number of seeds passing through the sensors is reduced. The number of seeds detected by seed sensors is shown by curve 508 and is less than the actual number of seeds planted. For computational ease, the actual seed count curve 508 is approximated in the "SIN" and "CUP" modes by dividing the seed graph 500 into three portions A 502, B 504 and C 506. The A 504 and C 506 segments are approximated with straight lines as shown by the dashed line for 504 and the intermittent dashed line 506, respectively. Approximating the actual seed count curve 508 with straight line segments A 504 and C 506 simplifies the computations involved in the computer, since the equation for the straight line, y=mx+b, is a much simpler computational process than the more complex equation which would be required for actual seed count curve 508. However, those skilled in the art will readily appreciate that the actual seed count curve equation could be substituted for the straight line approximation method described herein as the preferred embodiment without departing from the scope of the presently claimed invention.

Figure 23:
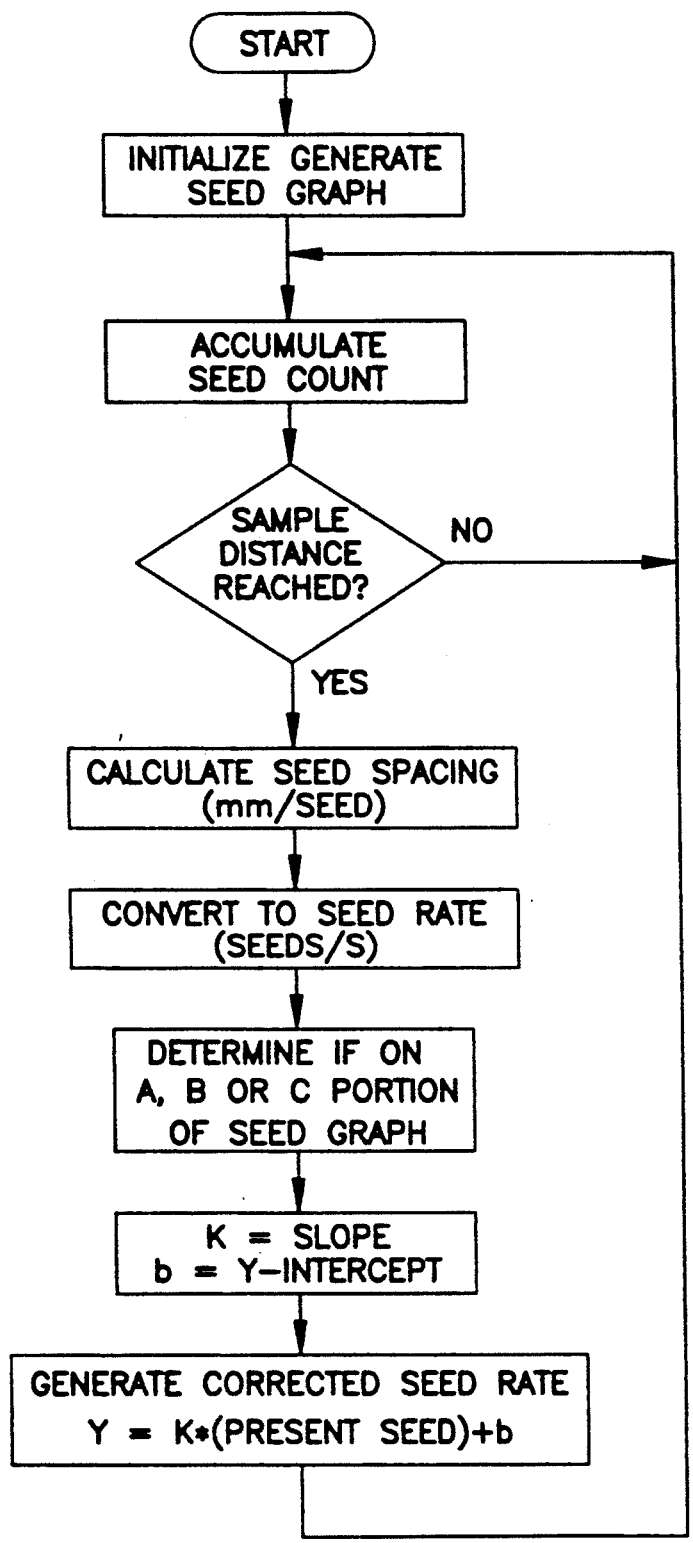
FIG. 23 shows a high level overall software control algorithm for the present invention.

FIG. 23 shows the overall control flow of the planter monitor system performance monitoring algorithm. At power up, the appropriate seed graph is generated by the initialize algorithm (discussed below). As discussed above, a different seed graph is generated depending on the seed counting method selected by the operator. After the seed graph is generated, the seed count at the seed sensors is accumulated over a sample distance. The sample distance and the accumulated seed count are then used to determine the seed spacing in units of millimeters per seed. The seed spacing is then converted to a seed rate (seeds per second) using the sensed speed of the mobile planter apparatus as the conversion factor. This seed rate is the actual seed rate located on the x-axis of the generated seed graph. The seed graph is then referred to determine on which of the three (for "SIN" and "CUP") or two (for "SEED 3" and "SEED 4") portions of the seed graph the actual seed rate is located on. At the time the seed graph was generated, the slope (k factor) and y-intercept (b) of each of the portions of the seed graph were saved. The appropriate slope and y-intercept corresponding to the selected seed graph portion are then used to generate an adjusted speed. The speed is adjusted by multiplying the appropriate slope by the present speed, and adding the y-intercept to arrive at the adjusted speed. In this manner, the planter monitor system of the present invention is able to accurately monitor the number of seeds being planted even though the seed sensors cannot accurately detect very high seed rate applications because the planters dump multiple seeds at a time to produce the high planting rate. If the planter can eject discrete seeds at a very high rate, the seed sensors would not need to correct for this inaccuracy. Thus it shall be understood that the need to "correct" the monitored seed count is not a limitation of any part of the planter monitor system of the present invention, but rather is required due to the manner in which many available planters plant at high seed rates (e.g. by dumping cups of seed at a time rather than individually ejecting one seed at a time at a very high rate). In essence, the algorithm applies a correction factor to the signals received from the seed sensors, refers to the appropriately generated seed chart, and outputs the actual or corrected seed count to the console LCD display.

FIG. 24 shows the software control flow for generating the seed graph. FIGS. 24A–C show the various power up initialization functions which must be performed upon power up. FIG. 24D and E show the control flow for the generation of the seed graph. First, the console is polled to determine which of the seed count methods the operator has chosen. If the operator has chosen singulated seed count method, the three portions of the seed graph are generated. For example, control box 520 in FIG. 24D shows four points from which are generated three straight lines which approximate this singulated seed count seed graph, (0,0)(26,26)(60,60)(70,70). As will be understood by looking at the points in control box 520, the seed graph for the singulated seed count method is a linear unity gain, starting at origin (0,0), and extending to point (70,70).

If the seed count method selected is "CUP", control box 522 contains the four points for generating the three portions of the "CUP" seed graph. Control 522 shows that the A portion of the "CUP" seed graph is a linear unity gain region extending from point ( 0,0 ) to point ( 26,26 ). The B portion of the graph extends from point (26,26) to point (74,44). The final portion of the graph is generated from points (74,44) and (125,51). The point values used to generate the seed graphs for both the "SIN" and "CUP" seed methods are programmed into the software. The points were determined by performing tests on various brands of "SIN" and "CUP" type planters, and it was determined that most commonly available "CUP" type planters used the same "CUP" size. Thus, there is no need to program different point values for different "SIN" and "CUP" planters since the vast majority of them have been determined to have the same seed graph characteristics.

Control boxes 524, 526 and 528 generate the linear equations for the A, B and C portions, respectively, of the seed graphs for either "SIN" or "CUP" seed counting methods using the familiar $y = mx + b$ equation. The equations are saved to memory for later use.

Figure 24A:
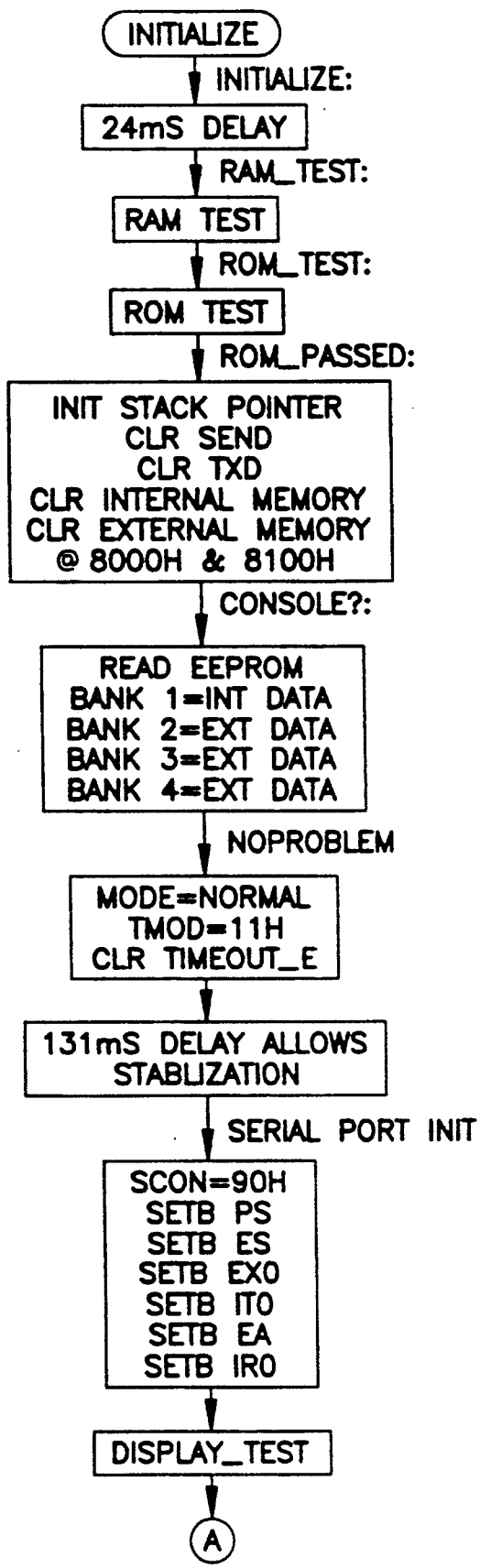
FIGS. 24A-E show the control algorithm for generating an appropriate seed graph corresponding to the operator selected seed count method.
Figure 24B:
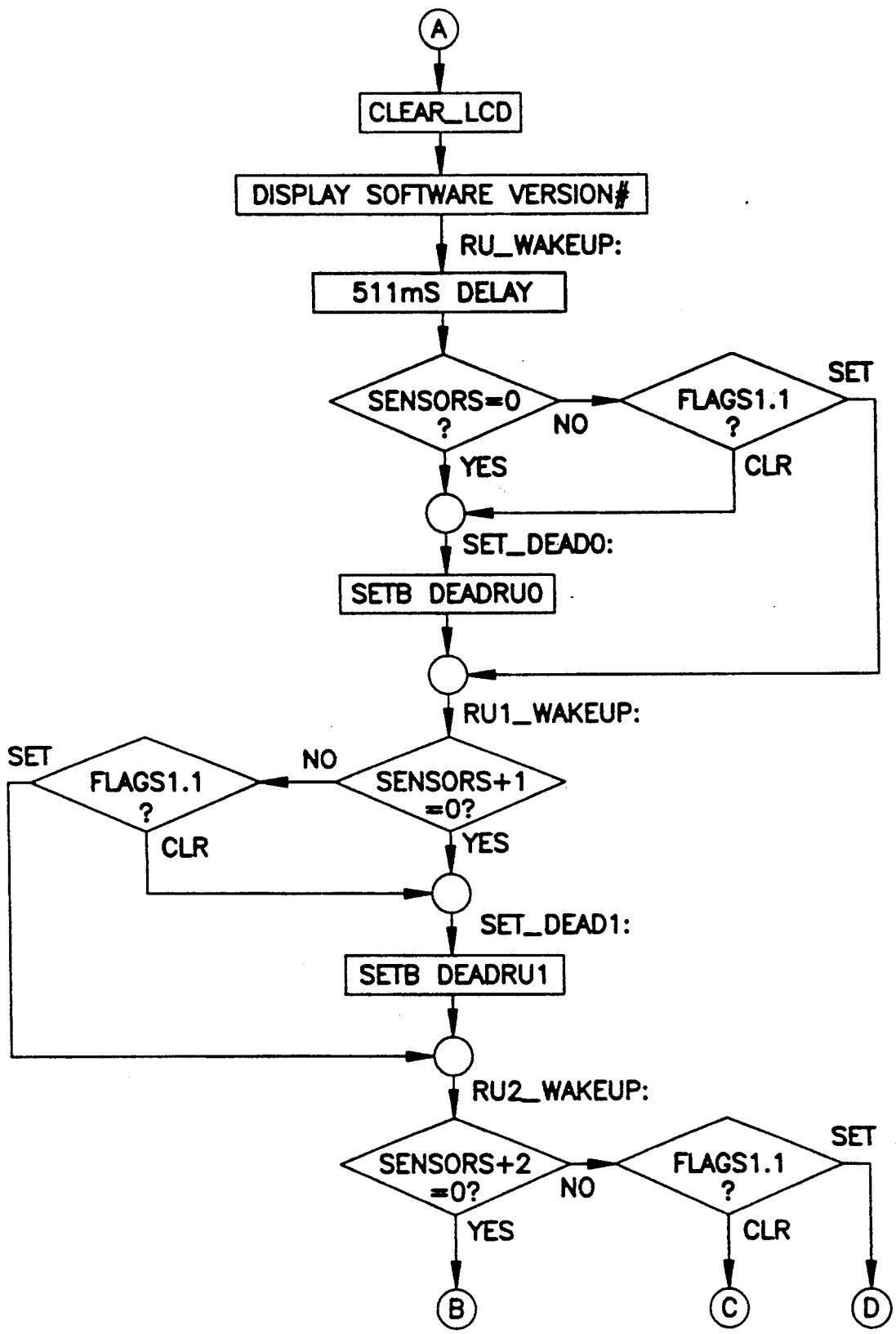
Figure 24C:
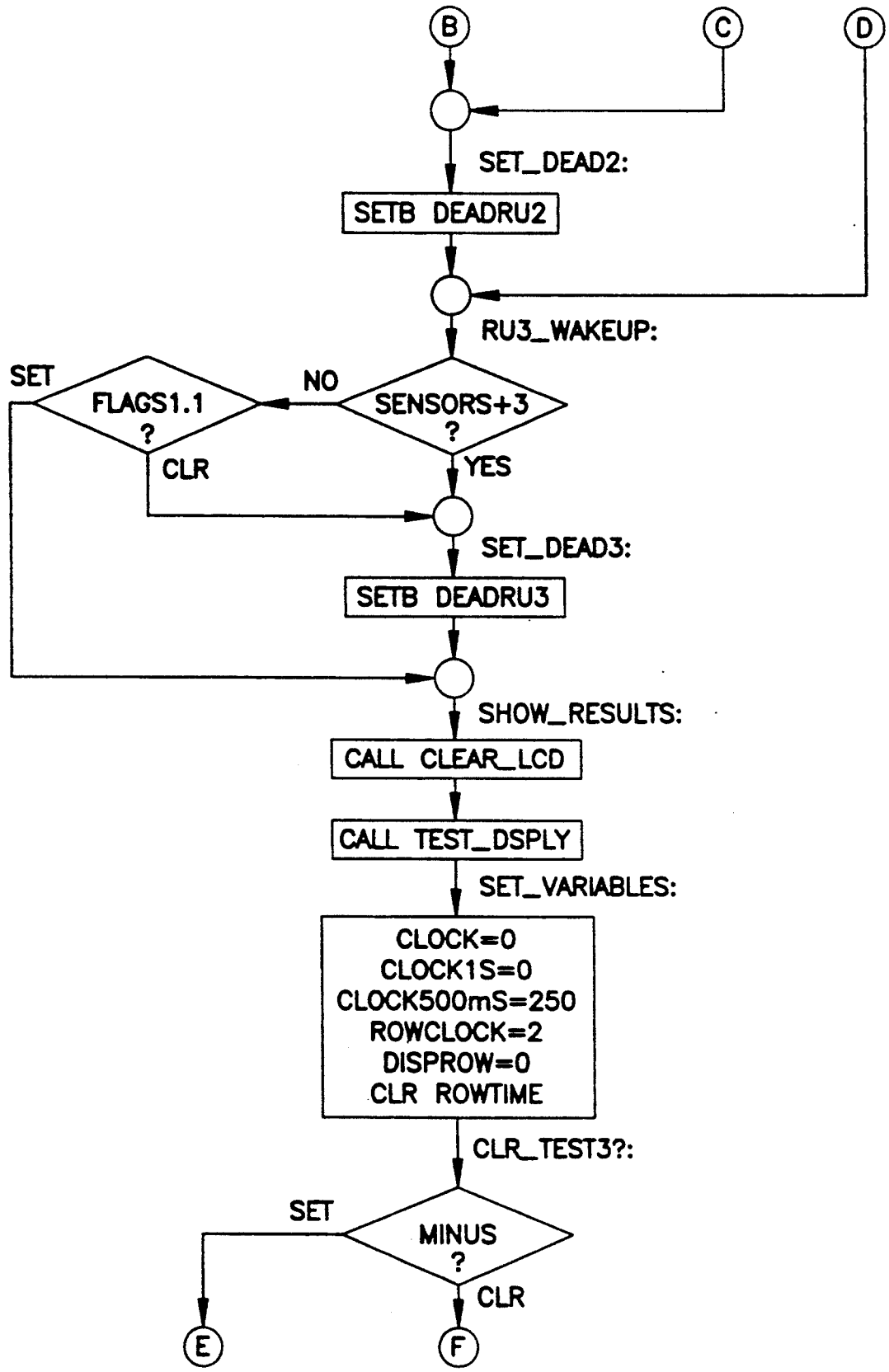
Figure 24D:
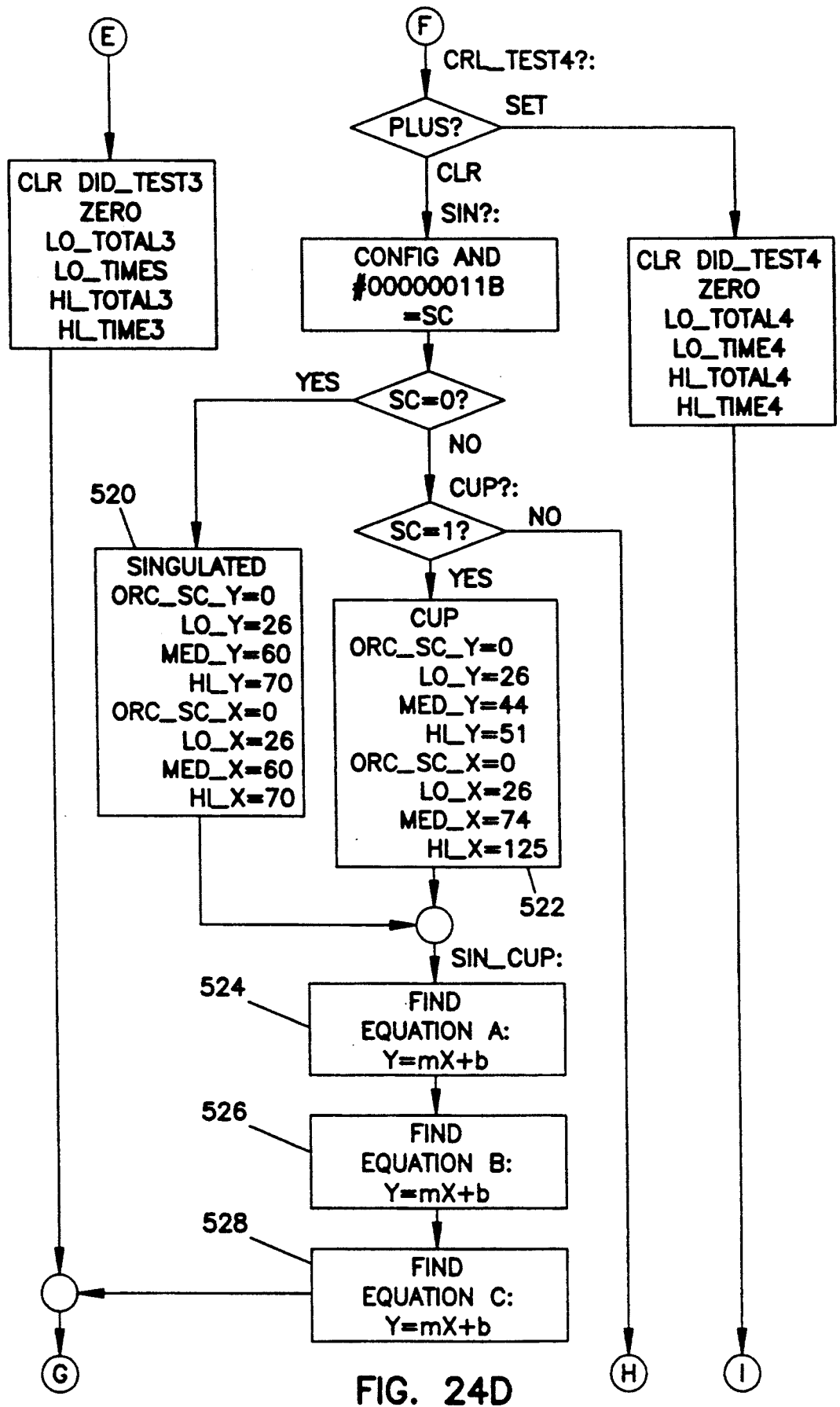
Figure 24E:
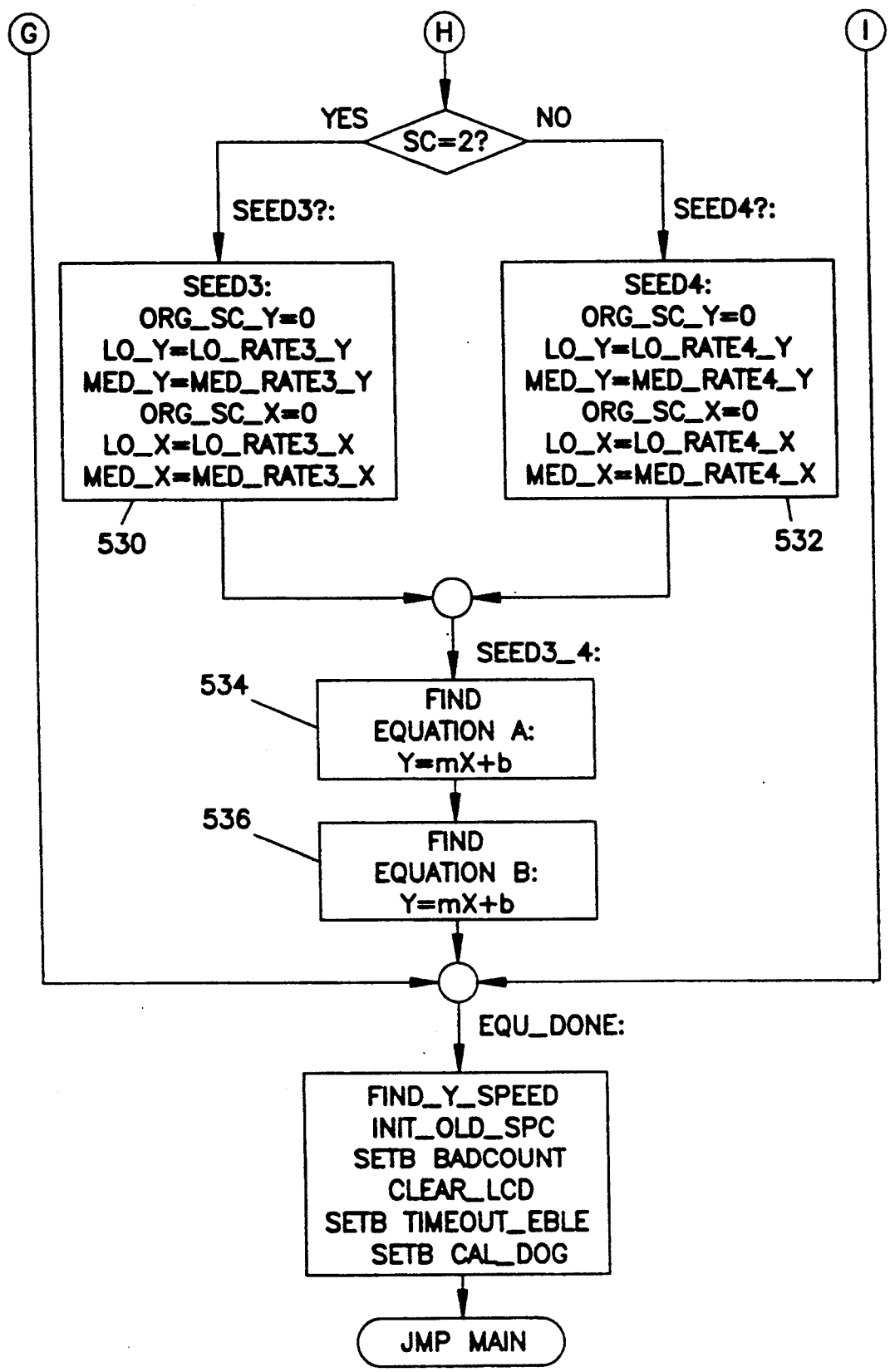

If either the "SEED 3" or "SEED 4" seed counting method are chosen, the seed graph is generated as shown in FIG. 24E. As stated herein previously, "SEED 3" and "SEED 4" seed count methods are used for very high seed rate applications and allow the operator to configure the planter monitor system of the present invention to specially fit the particular planter characteristics. The "SEED 3" and "SEED 4" utilize only two points (in addition to the origin) on the seed graph to approximate the seed graph. The operator generates these points by setting both a low seed rate and a high seed rate for the particular planter being used. The low and high seed rates are the two points on the y-axis which are the operator entered test (OET) points from which the seed graph is determined. The operator then enters the actual seed count at both the low and high seed rates. The operator entered seed graph data are then stored and used by control boxes 530 and 532, and by control boxes 534 and 536 to generate the two portions of the seed graph for the "SEED 3" or "SEED 4" counting methods.

Referring again to FIG. 23, after the seed graph has been generated, the row unit receives the information from the seed sensors and accumulates a seed count over a sample distance. The row unit uses the distance traveled and the number of seeds counted to calculate a seed spacing in units of millimeters per seed (mm/seed). The seed spacing calculated at the row unit is sent to the console microcontroller. The console microcontroller converts the seed spacing received from the row unit using the sensed speed of the mobile planter apparatus as the conversion factor.

Figure 25A:
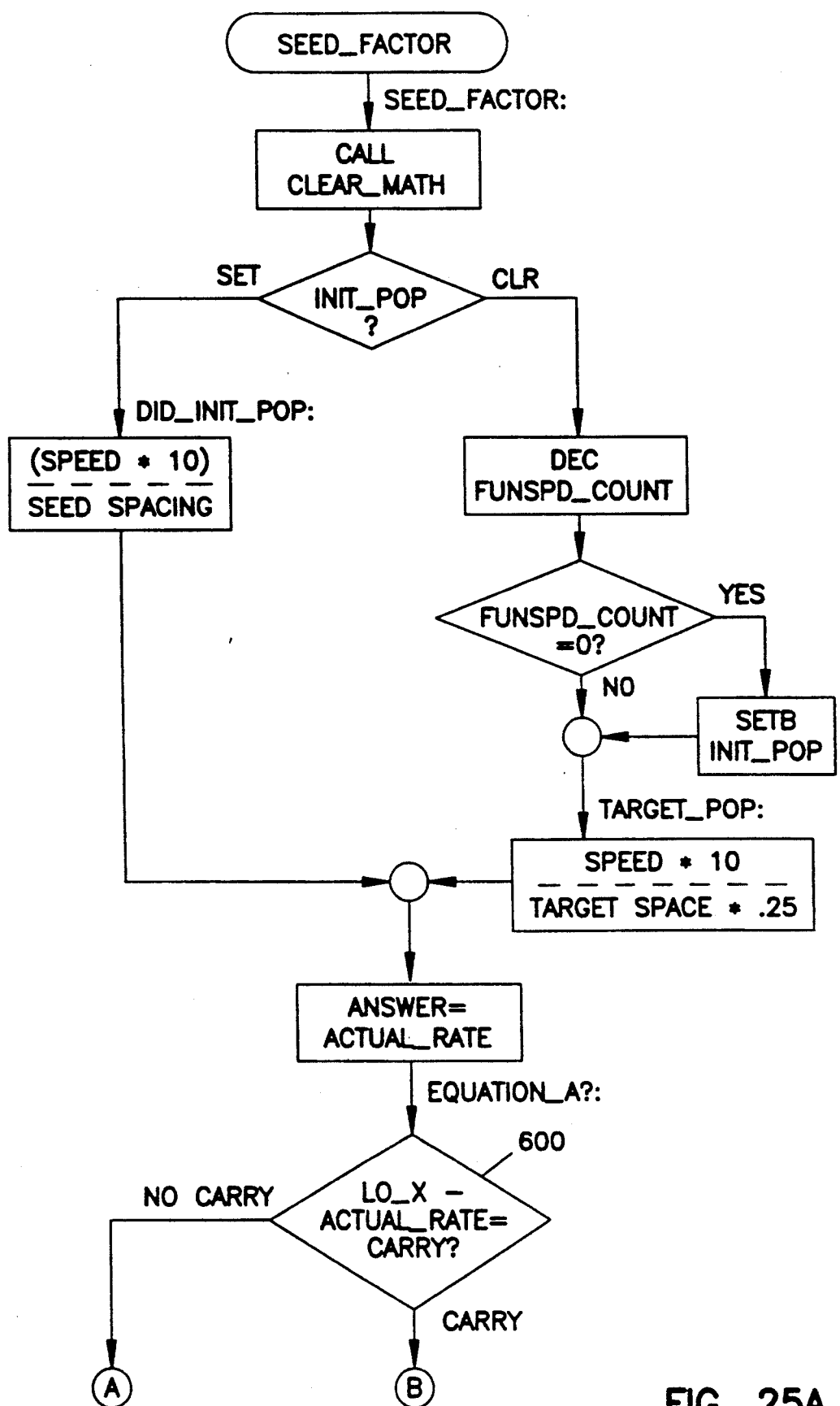
FIGS. 25A-B show the control algorithm for determining the appropriate portion of the seed graph on which the actual seed rate is located.
Figure 25B:
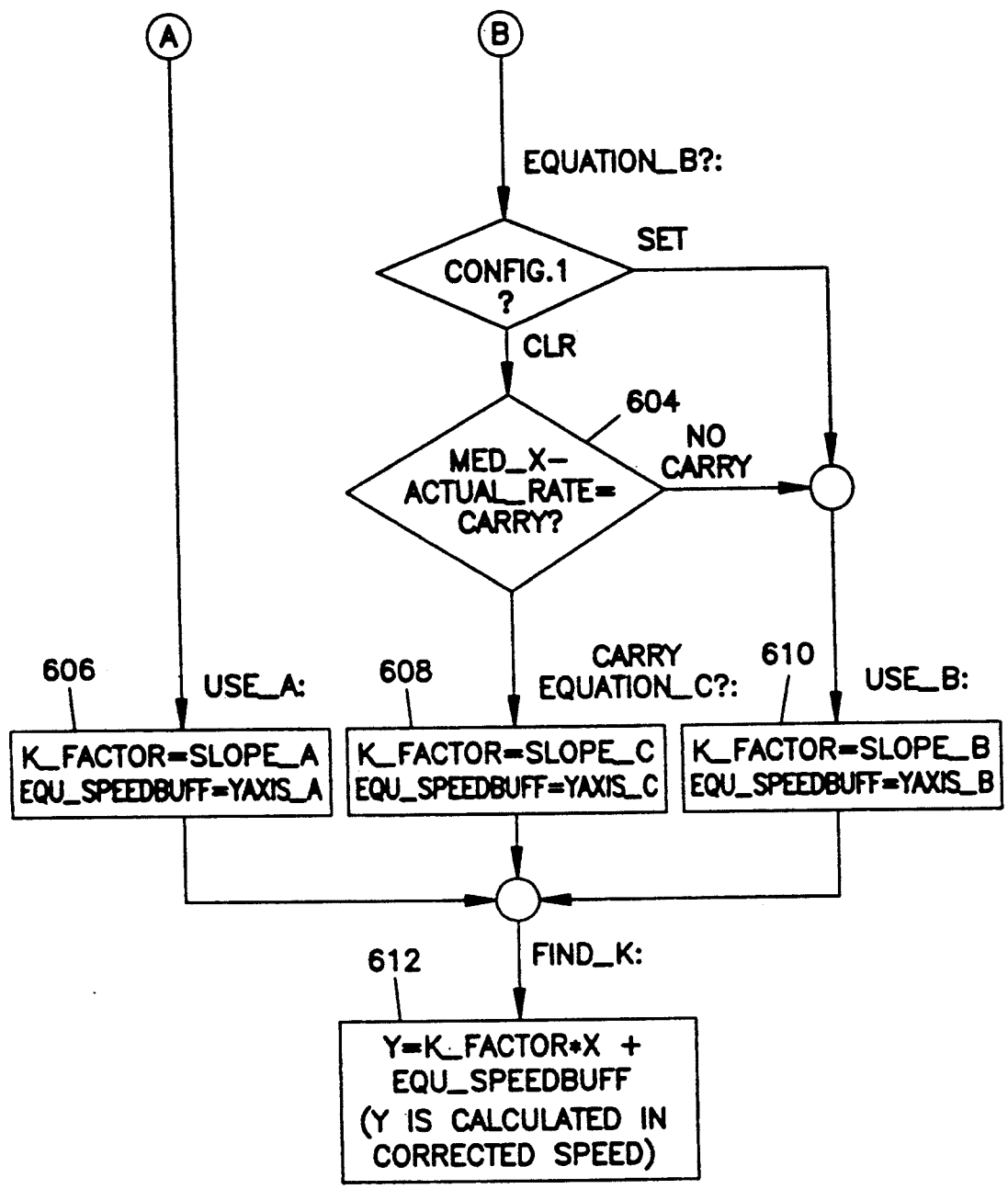

The next function in the control flow shown in FIG. 23 is to determine on which portion of the seed graph the actual seed rate is located. FIG. 25 shows the algorithm for determining the appropriate values. Essentially, the algorithm shown in FIG. 25 compares the actual seed rate with the three points on the graph from which the three linear portions of the seed graph were generated from.

For example, decision box 600 compares the actual rate with the first point on the x-axis. If the actual rate is less than the lowest point on the x-axis, the A portion of the seed graph should be used and the k factor and Equ Speedbuff (y-intercept in units of mm/s), are outputted at control box 606. If the actual rate is between the low and medium points on the x-axis, then the "B" portion of the seed graph should be used. The slope and y-intercept are determined at decision box 610. Finally, if the actual rate is greater than the medium rate then the "C" portion of the seed graph should be used. The slope of the "C" portion and the y-intercept are determined at control box 608. The appropriate k factor and y-intercept are output at control box 612.

Referring again to FIG. 23, after the slope and y-intercept of the appropriate portion of the seed graph are determined, an adjusted new speed signal is generated. The y-intercept must first be converted from units of seeds/second into speed units of mm/s. Dividing the y-intercept value (seeds/s) by the target rate (seeds/foot) set by the operator, and multiplying by the appropriate conversion factor, results in the y-intercept value in units of speed, or mm/s.

Figure 26:
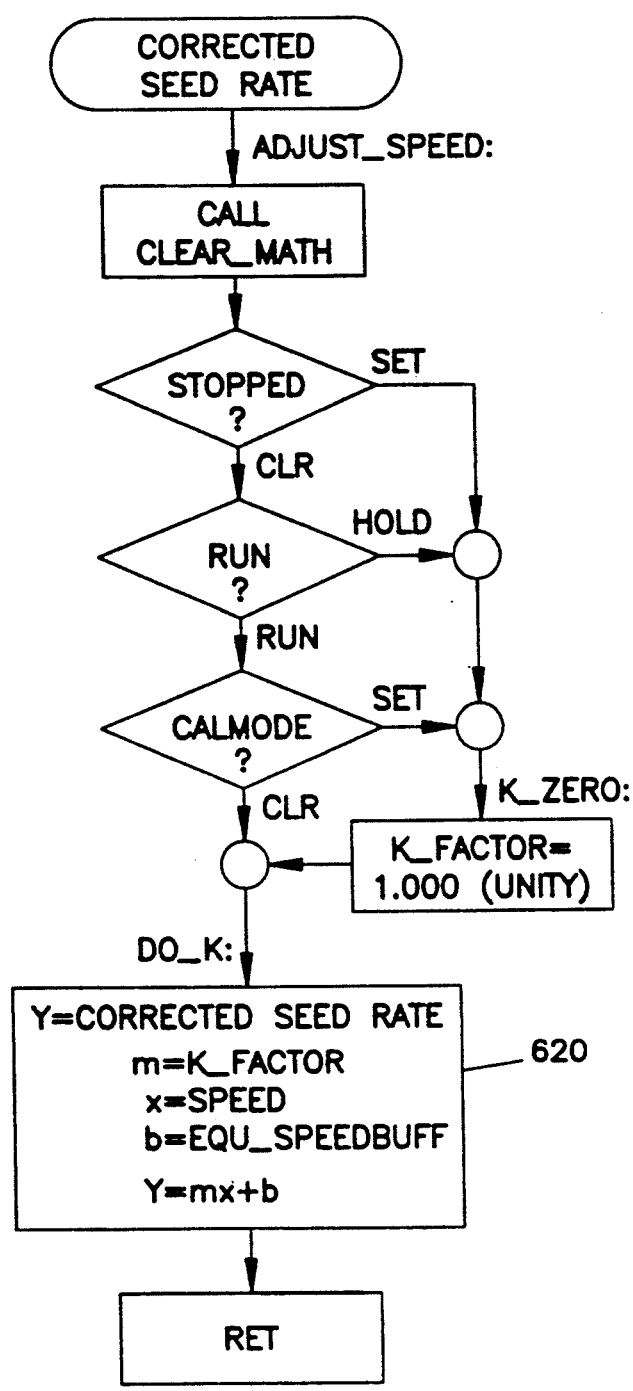
FIG. 26 shows the control algorithm for generating an adjust speed signal which is displayed at the console.
Figure 27A:
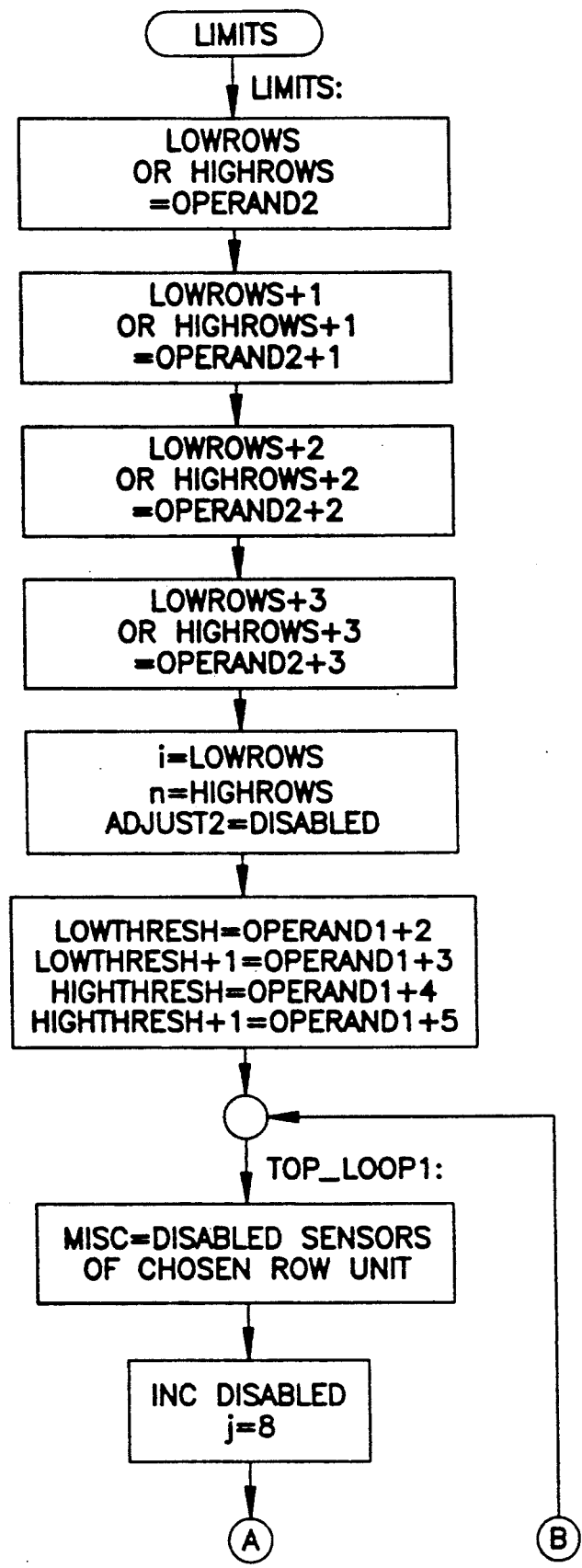
FIGS. 27A-D show the control algorithm which checks each working row for over or under application.
Figure 27B:
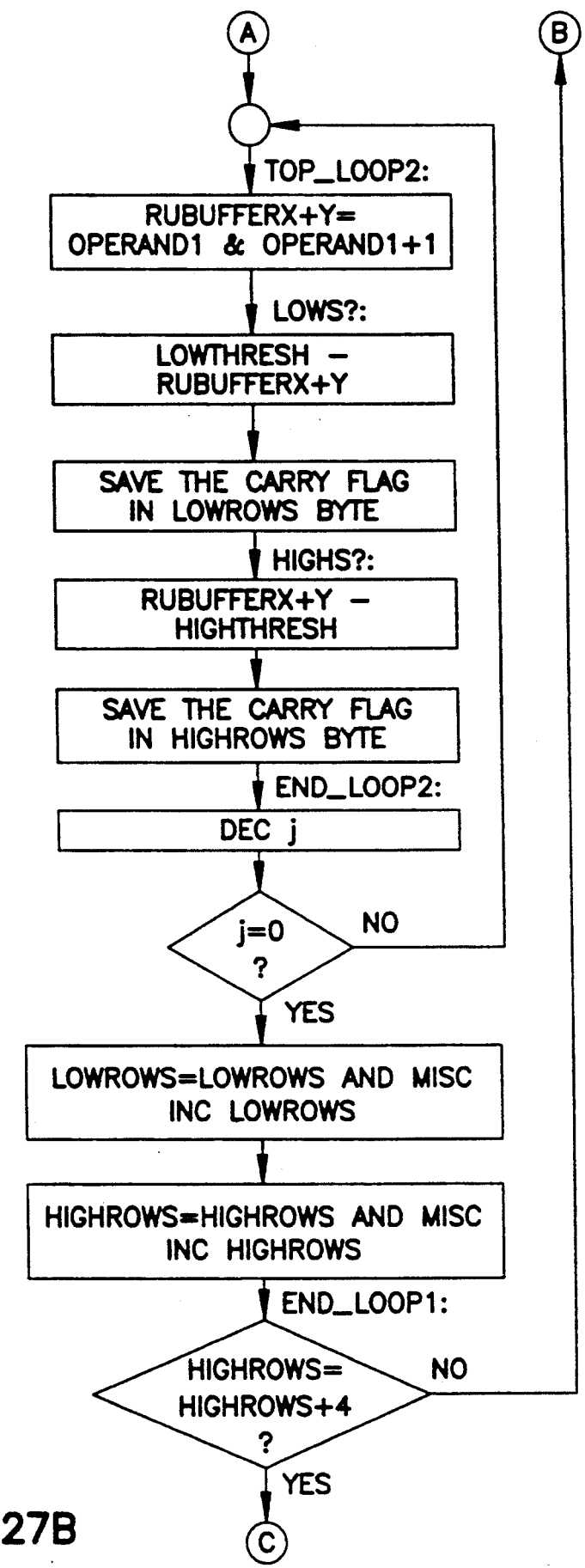
Figure 27C:
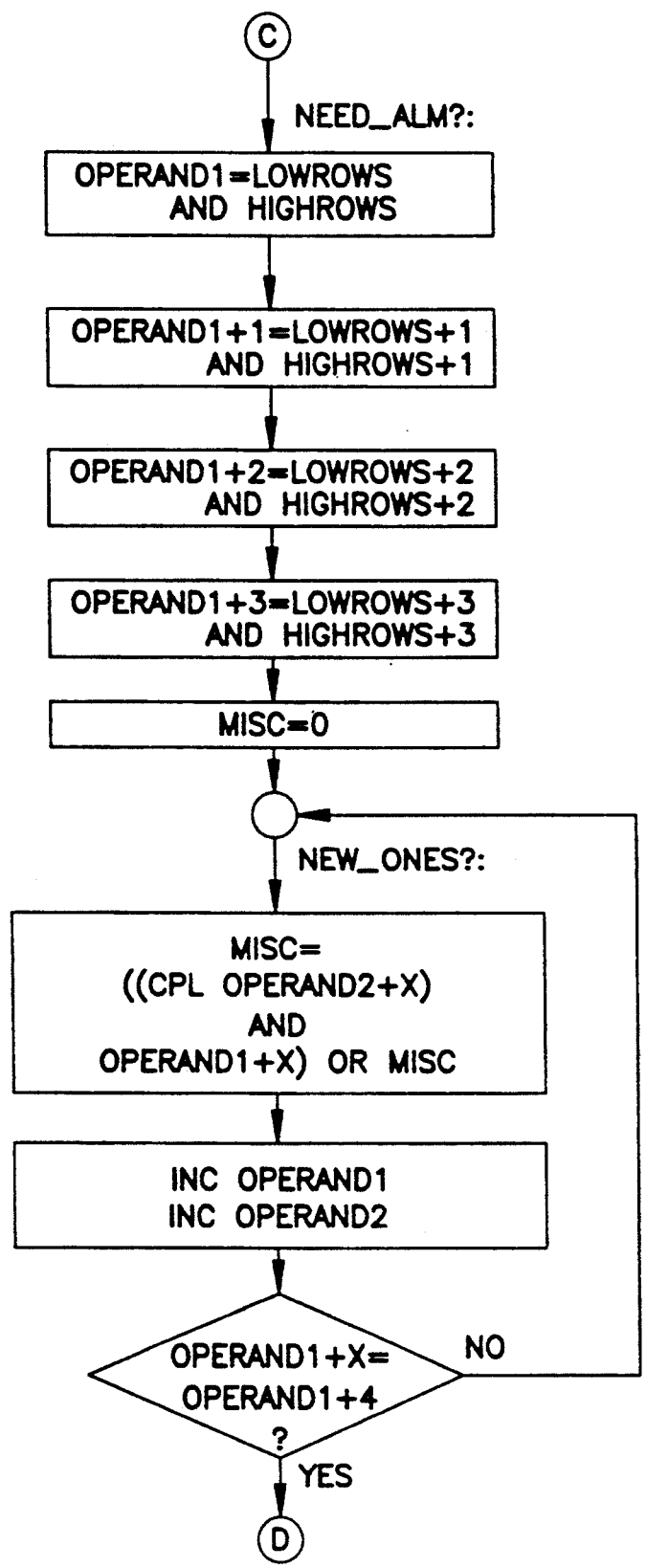
Figure 27D:
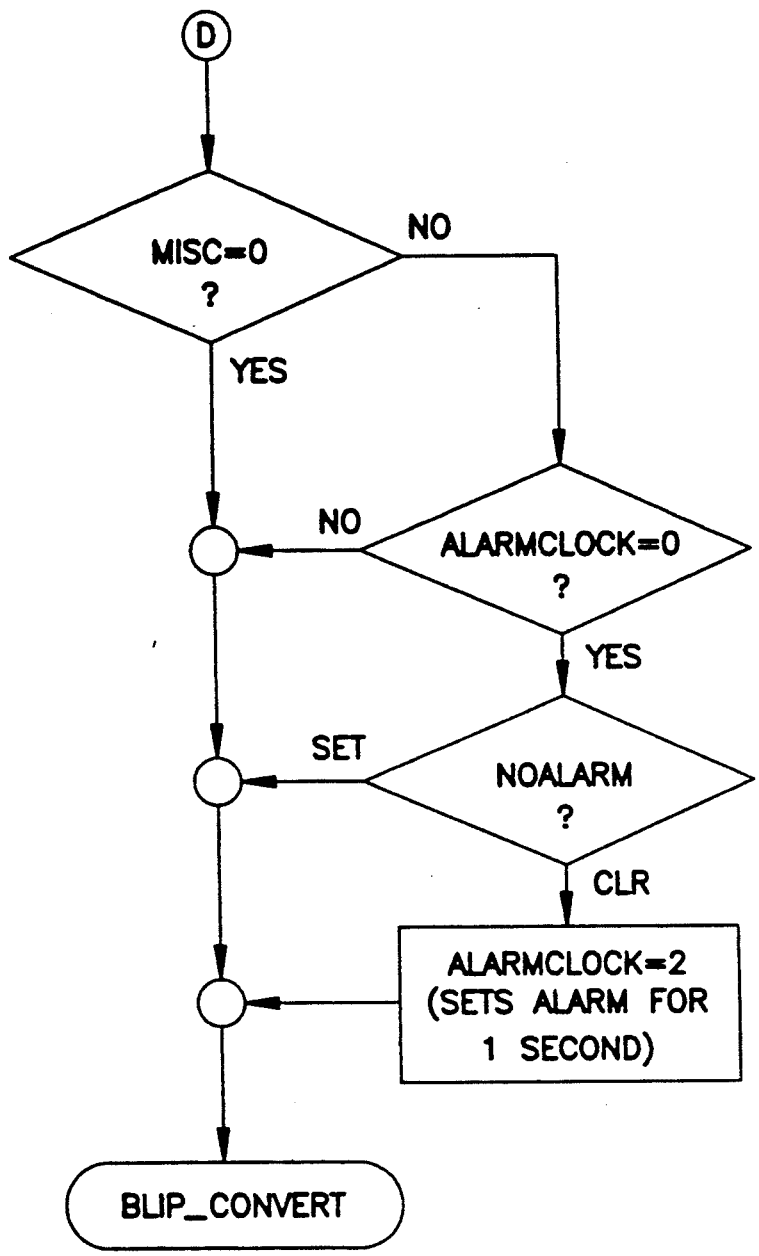
Figure 28A:
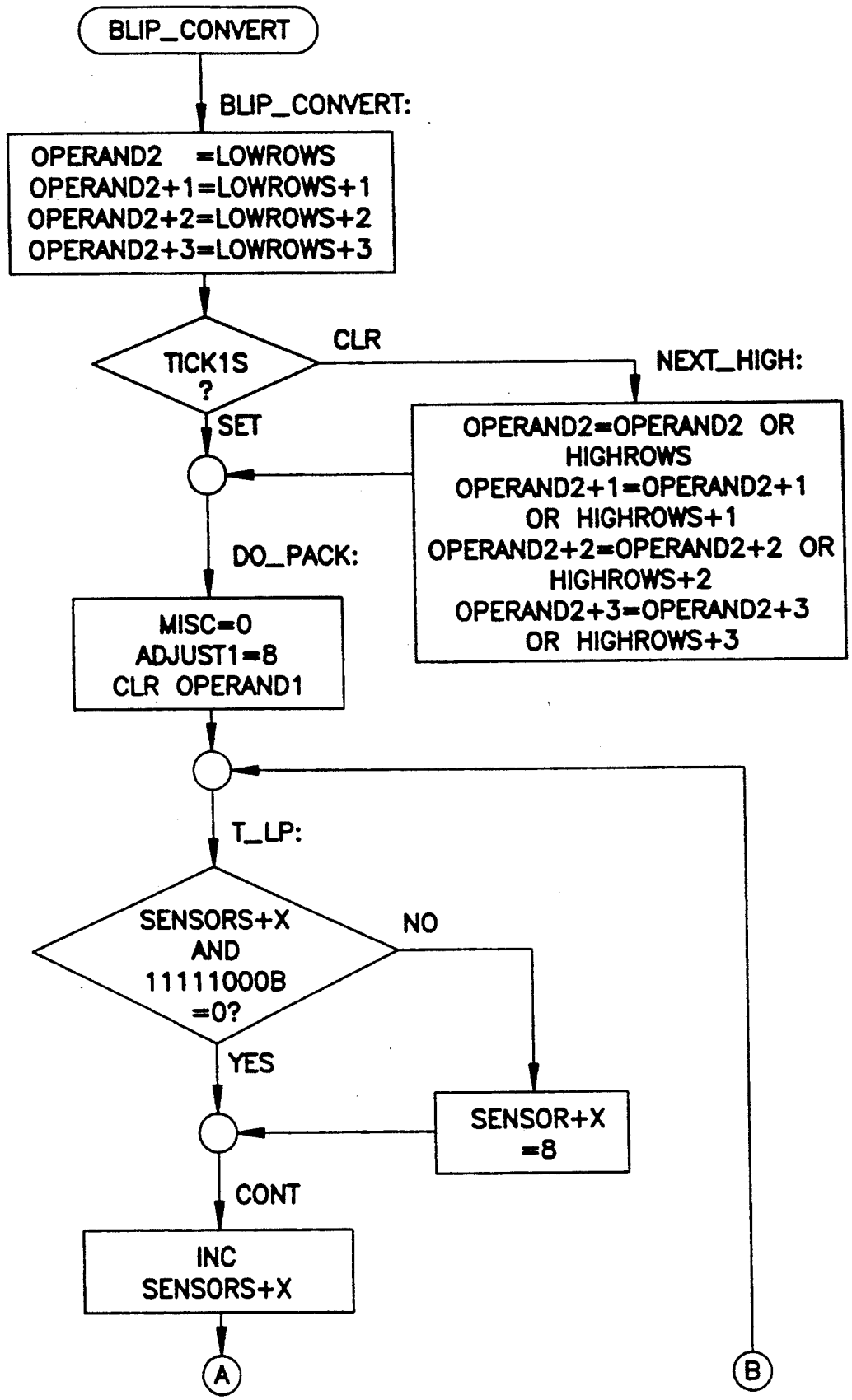
FIGS. 28A-D show the control algorithm for enabling the row status bars on the console.
Figure 28B:
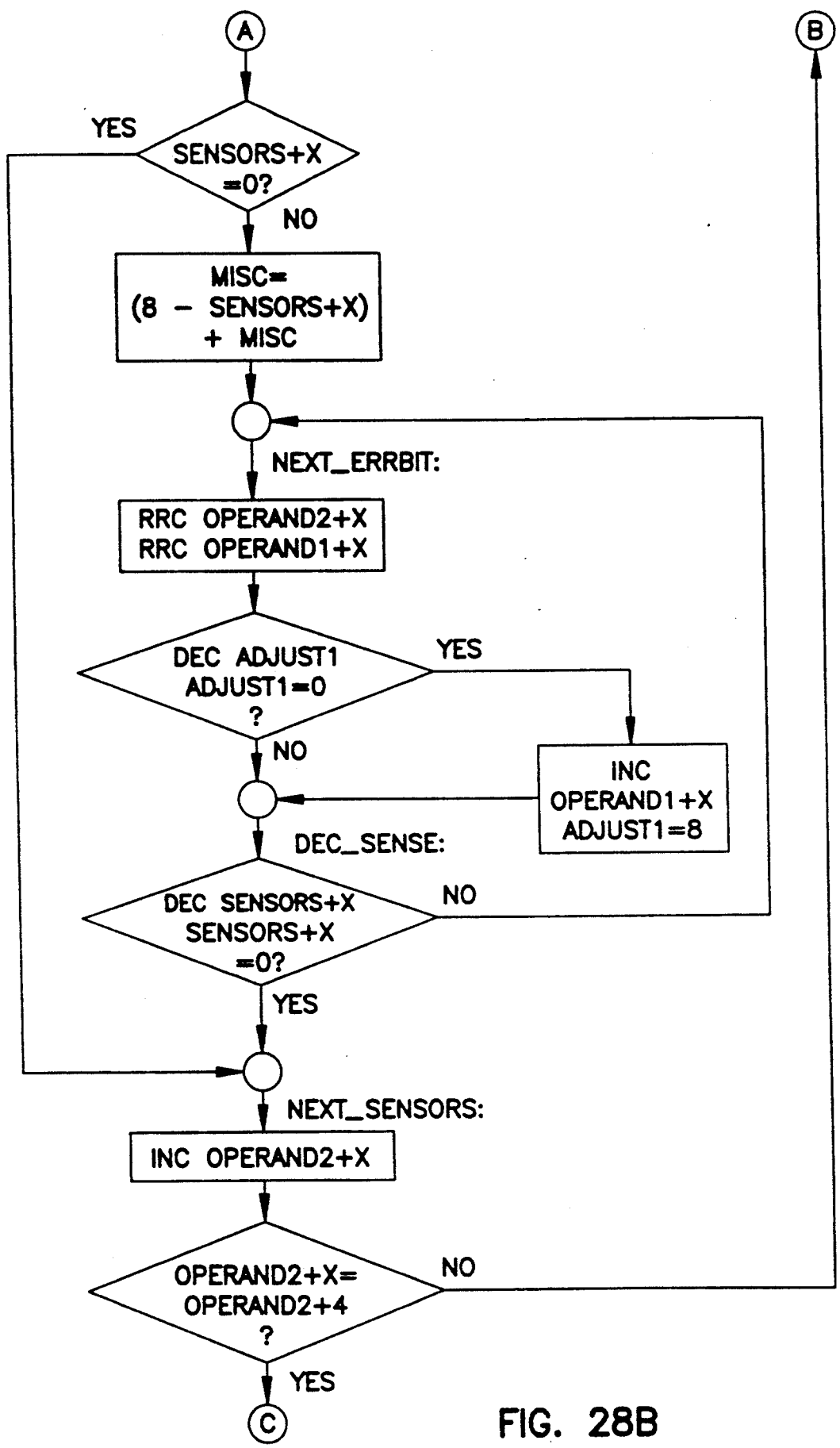
Figure 28C:
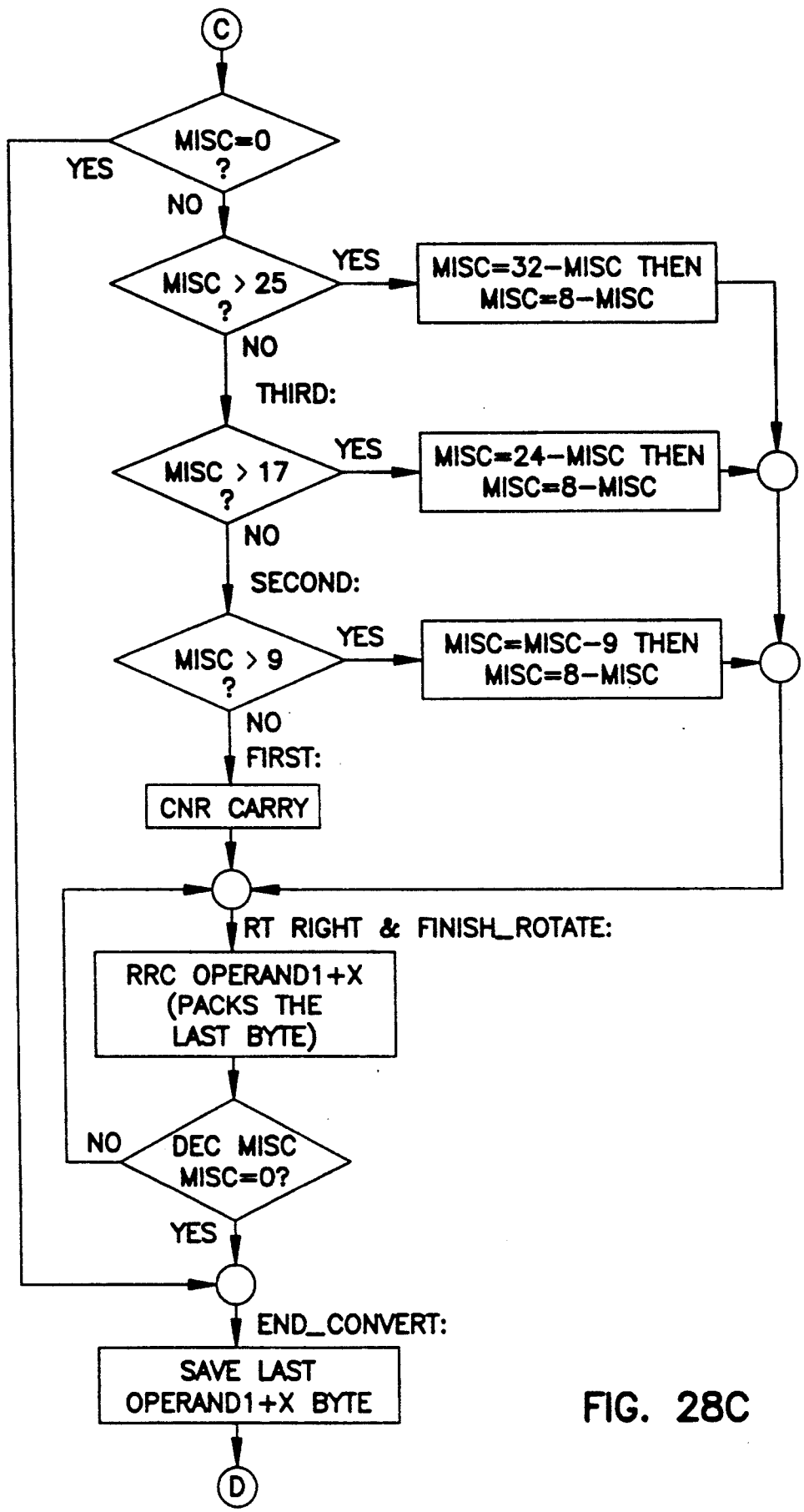
Figure 28D:
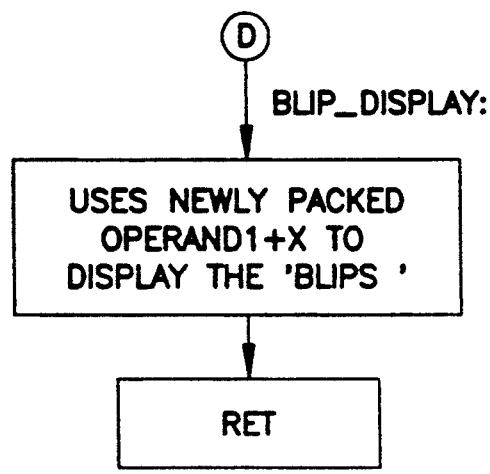

FIG. 26 shows the algorithm for generating and outputting the corrected seed rate. The y-intercept (b, in mm/s), slope (k factor) and the actual present speed of the mobile planting apparatus (x, in mm/s), are used in the equation Y=mx+b as shown in control box 620 of FIG. 26 to arrive at a corrected seed rate y in units of speed (mm/s). The row unit converts this value to a corrected seed rate in units of seeds/s. This value is used by other control algorithms described herein to determine seed rate ( seeds/s ) population (seeds/area) spacing (distance/seed) percent error from target, to determine which rows are over or underplanting, etc.

FIG. 27 shows the control algorithm for checking each working row for over or under application. This control algorithm contains a loop which cycles through and checks the signals coming from each of the eight seed sensors and determines which of the eight rows is planting either below or above the operator selected limits. The algorithm next determines whether the audible alarm is necessary, giving the operator an audible indication that a row or rows are over or under planting. The subroutine then calls the control algorithm shown in FIG. 28. The algorithm shown in FIGS. 28A-D receives the information concerning the over and under planting rows and creates a control word for enabling row status registers to enable the appropriate row status bars to either a solid status bar (under planting), or a flashing status bar (over planting).

Figure 29A:
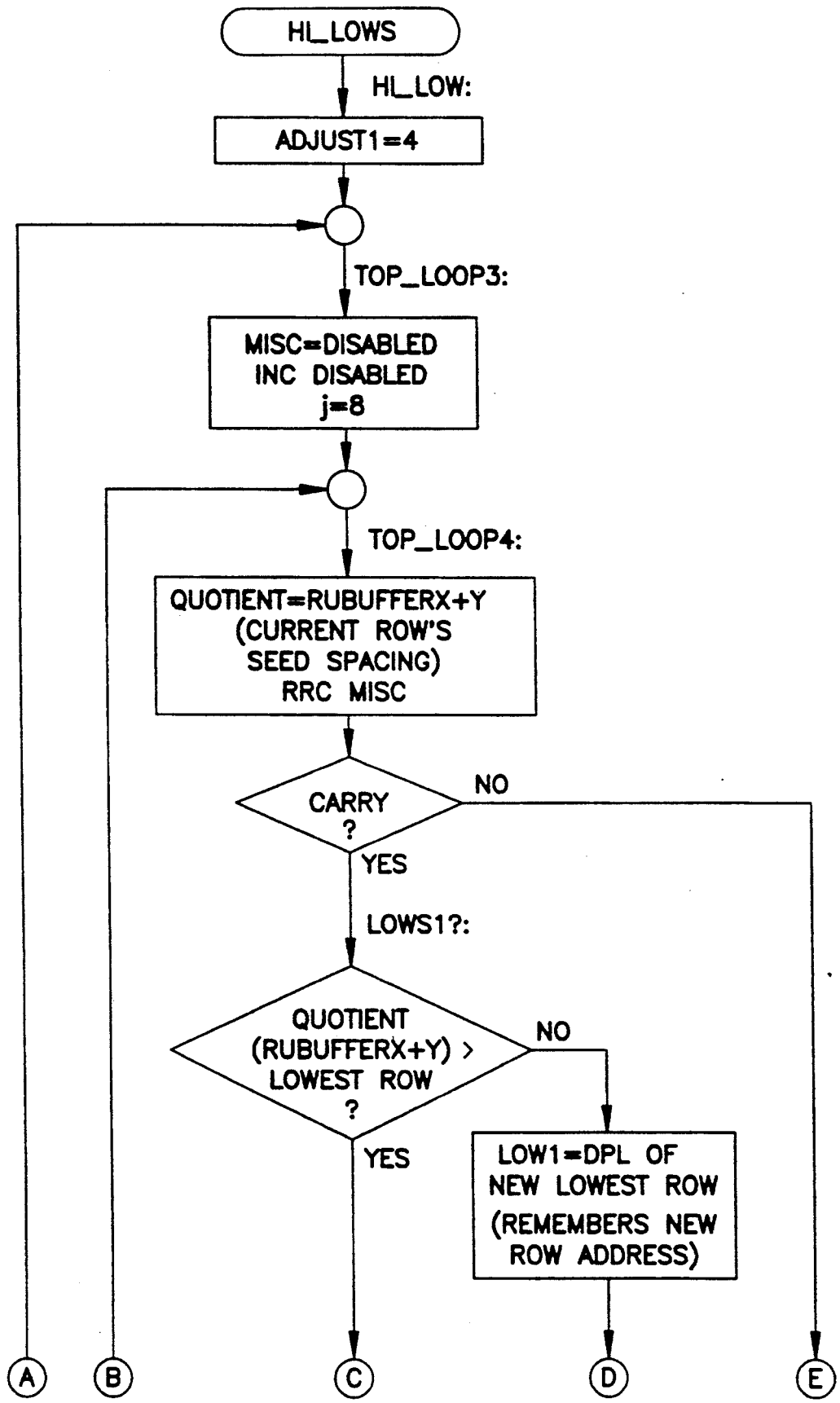
FIGS. 29A-C show the control algorithm for determining which working rows are plating highest and lowest.
Figure 29B:
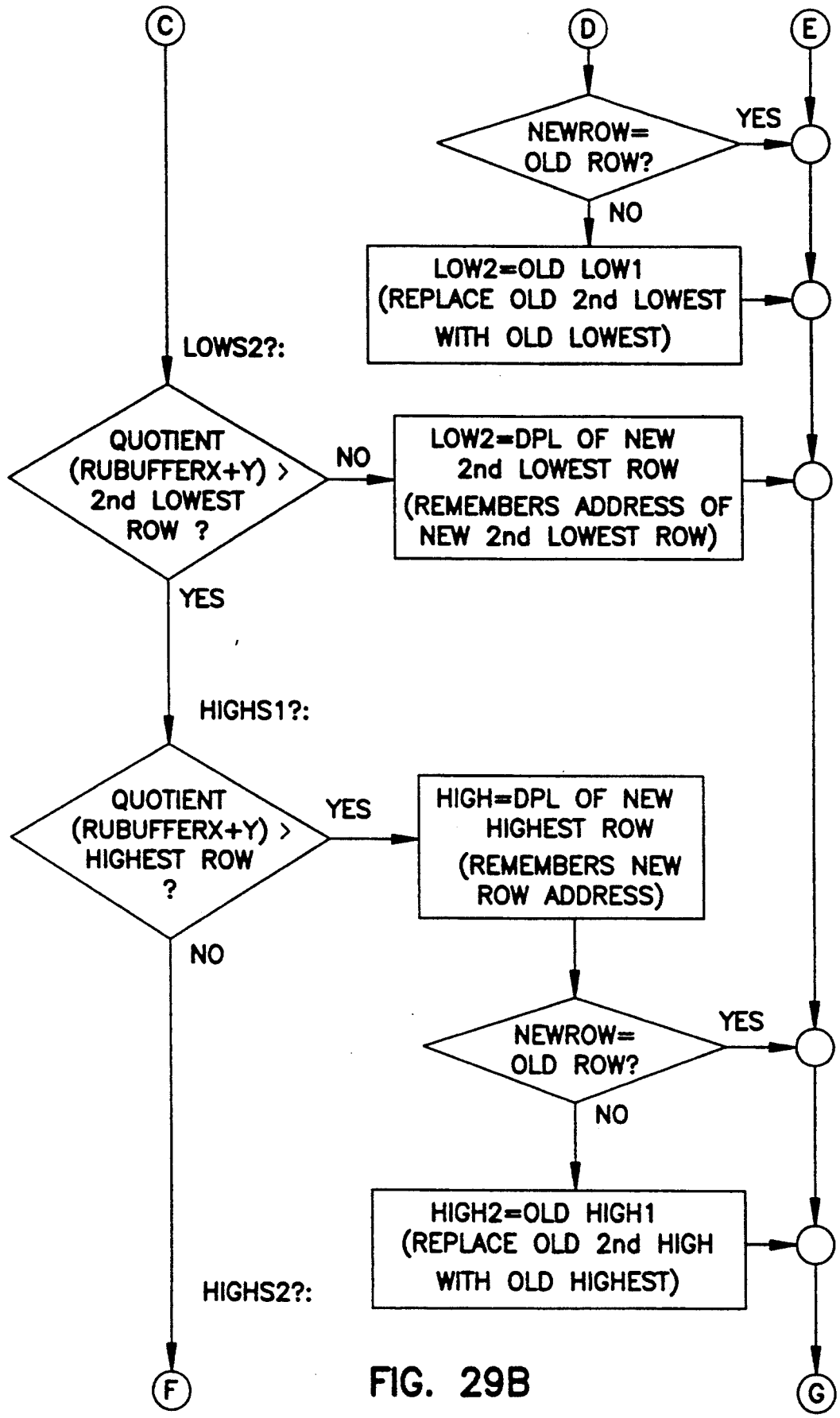
Figure 29C:
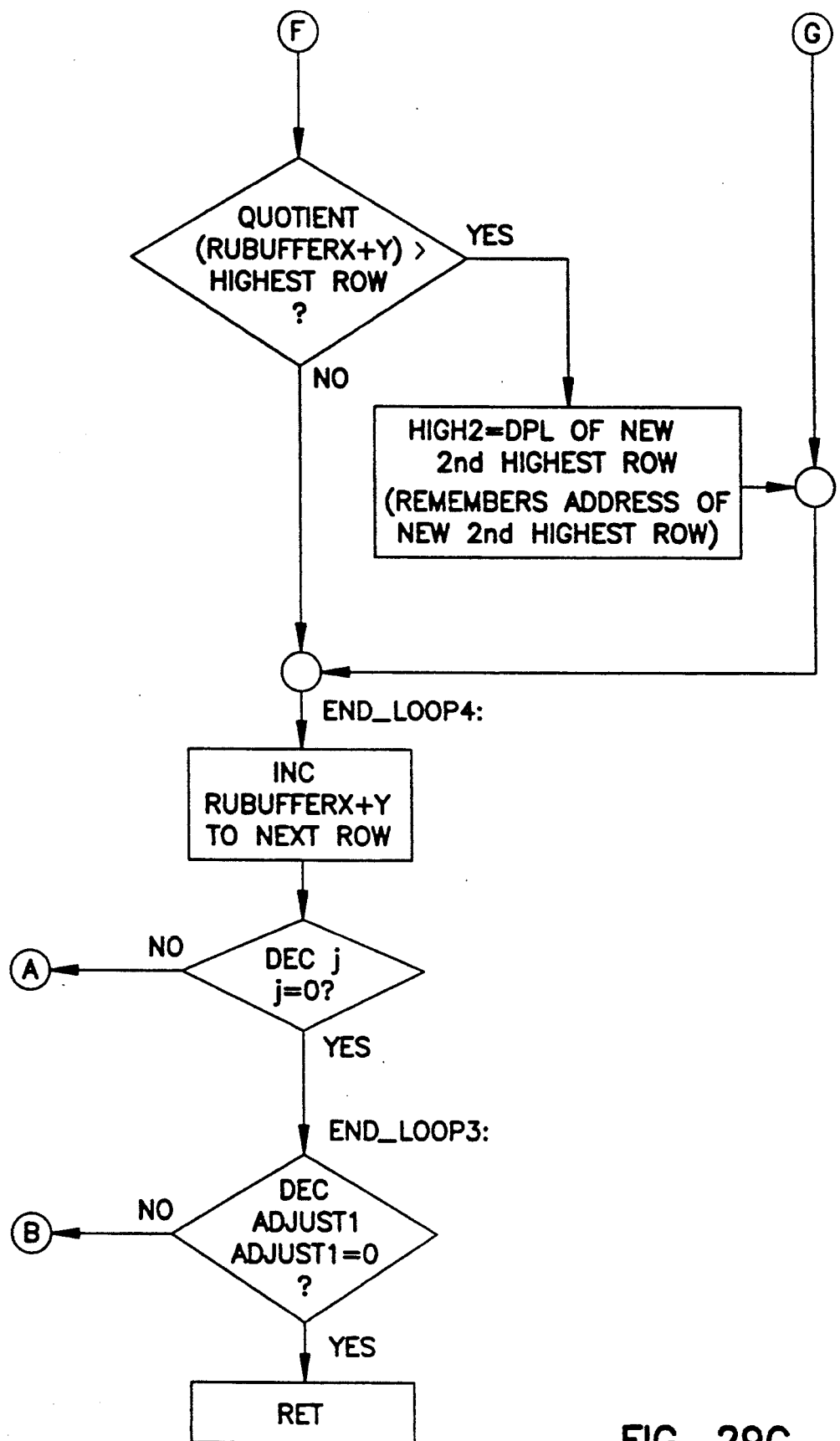

FIG. 29 shows the control algorithm for determining which working rows are planting highest and lowest, and for displaying the appropriate up or down arrow next to the six digit data readout corresponding to the row display. This algorithm scans through the seed rates for each of the working seed sensors to determine which row is highest, second highest, lowest, and second lowest. For the highest row a solid up arrow will be displayed, for the second highest row a flashing up arrow will be displayed, for the lowest row a solid down arrow will be displayed, and for the second lowest row a flashing down arrow will be displayed next to the six digit data readout when the data for that particular row is being displayed as was described above.

Figure 30A:
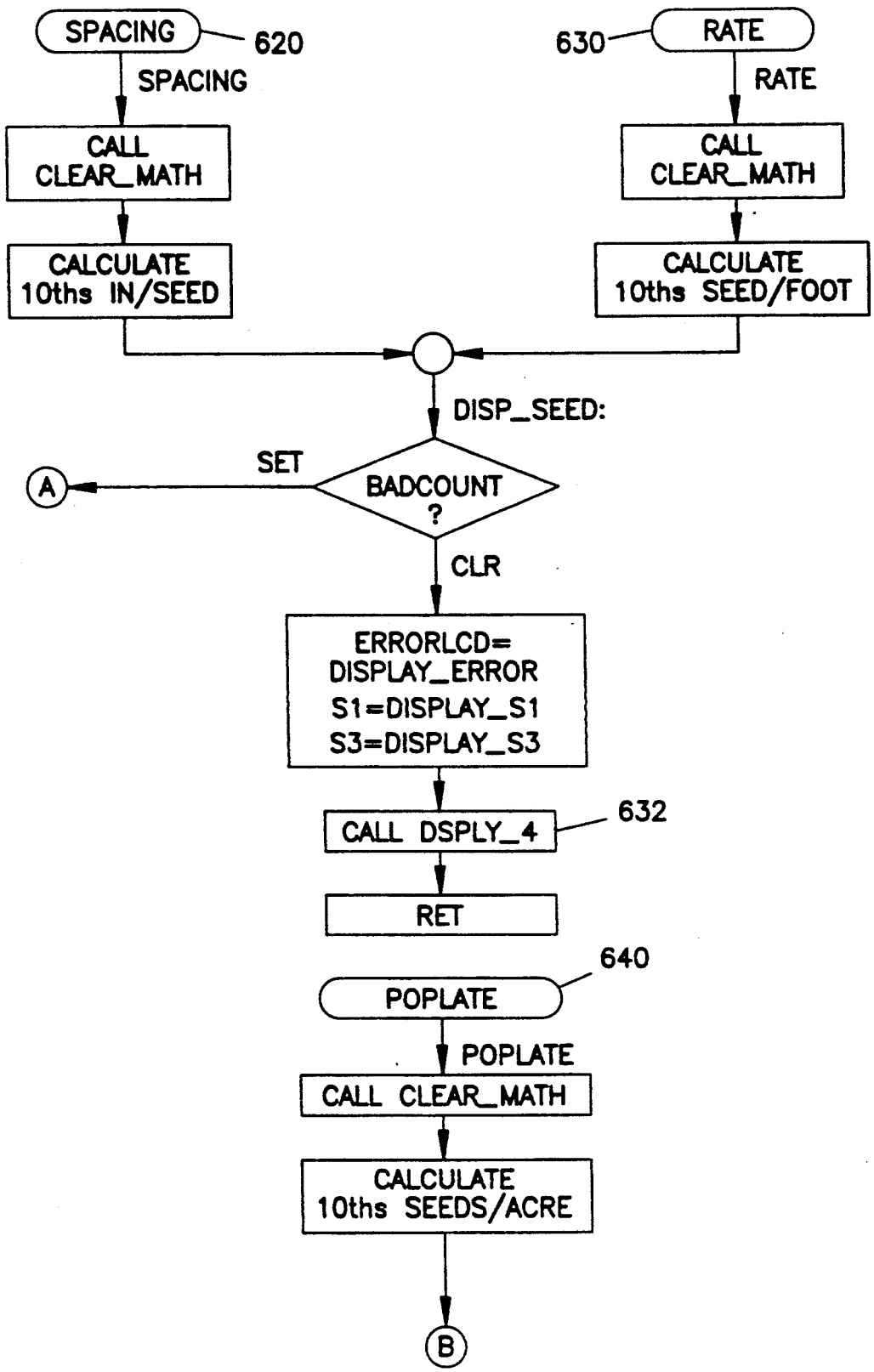
FIGS. 30A-30C show the control algorithm for calculating the percent error of the seed spacing and seed rate.
Figure 30B:
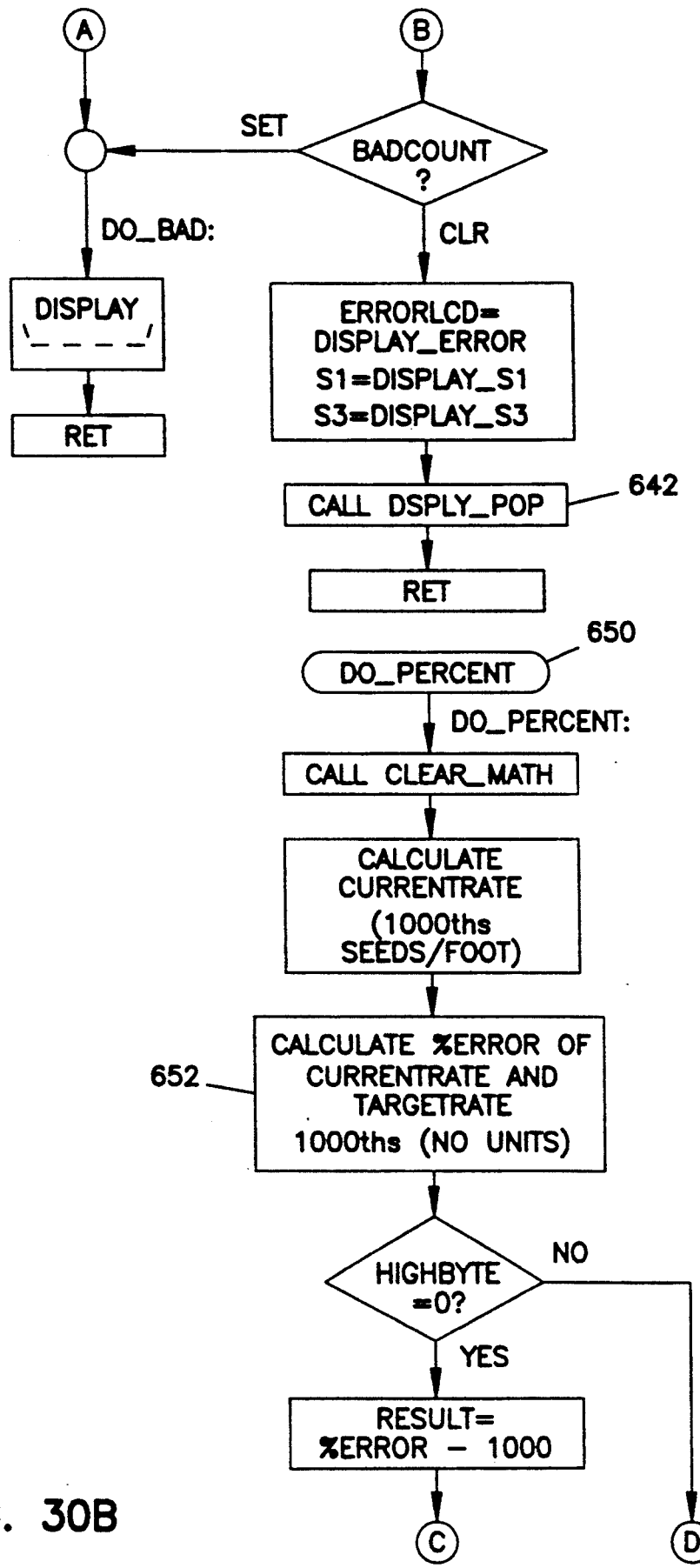
Figure 30C:
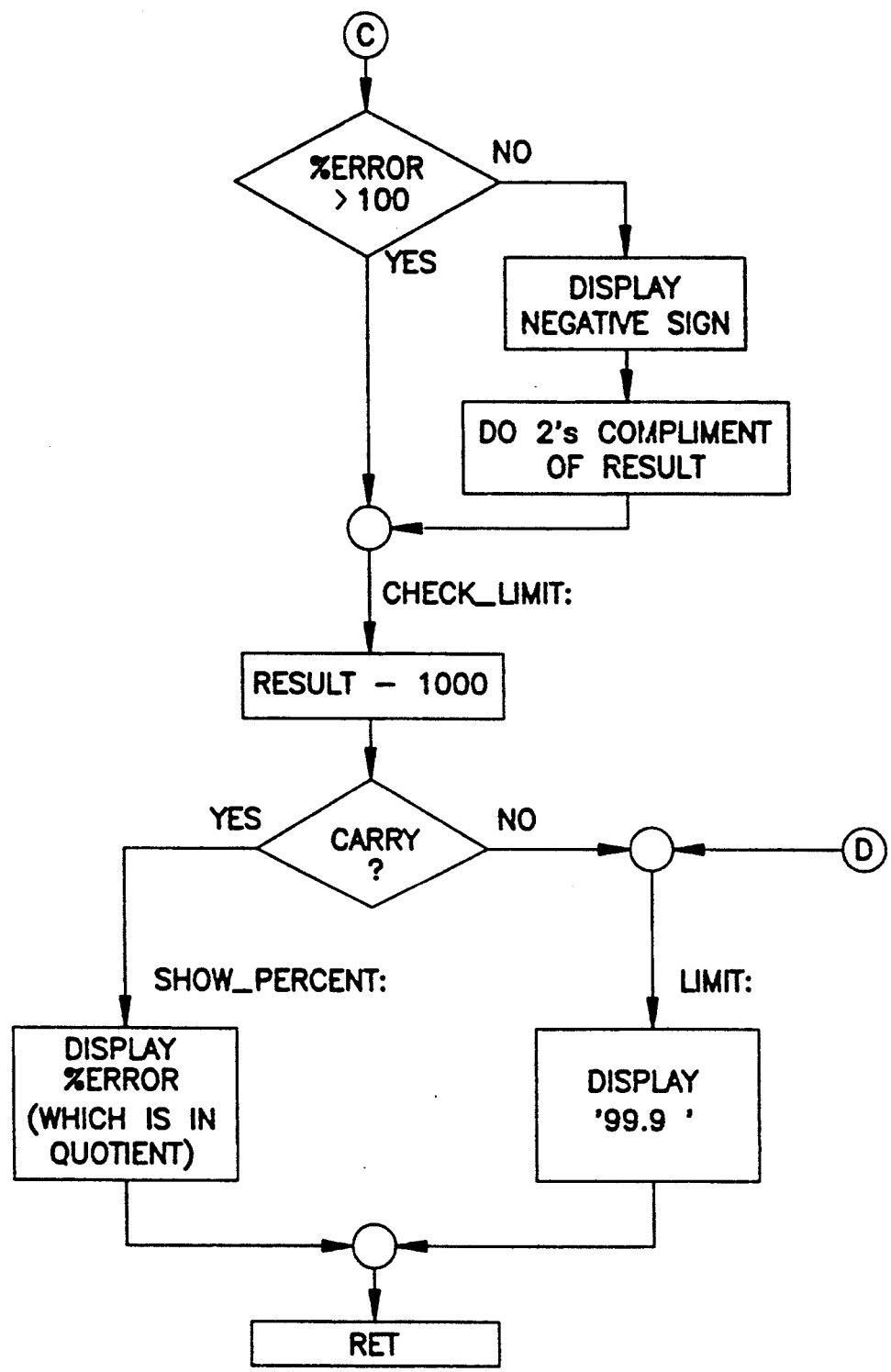

FIGS. 30A-C show the control algorithms for calculating the seed spacing 620, seed rate 630, seed population 640, and percent error 650. Seed spacing algorithm 620 receives the seed spacing information from the row unit and calculates the seed spacing in tenths of inches per seed. If the multiposition selector switch is set to display seed rate, the seed rate control algorithm 630 receives the seed spacing information from the unit and converts the seed spacing into a seed rate in tenths of seeds per foot. Both the seed spacing 620 and seed rate 630 algorithms share the same display algorithm 632, which has been submitted with the present application as an appendix.

If the multiposition selector switch has been chosen to display population, population control algorithm 640 receives the seed spacing information from the unit and calculates a seed population in the units of tenths of seeds per acre. The subroutine 642 displays the population. Subroutine 642 has been submitted with the present application as an appendix.

FIG. 30B-C shows the control algorithm for determining the percent error of the actual seed rate and target seed rate. The percent error control algorithm 650 receives the seed rate information from the row unit, calculates a current seed rate in the units of 1,000ths of seeds per foot. Control box 652 calculates the percent error on a basis of the current rate and the operator specified target rate. The algorithm then displays the percent error on LCD display.

The foregoing description of the preferred embodiment of the invention has been presented for purposes of illustration and description. It is not intended to be exhaustive or to limit the invention to the precise form disclosed. Many modifications and variations are possible in light of the above teachings. For example, any number of row units and seed sensor configurations could be used without departing from the scope of the present invention. Similarly, an LCD display need not be used: CRT, gasplasma or other display technologies could be substituted for the specific LCD display discussed with respect to the preferred embodiment.

In addition, it shall be understood that the console and control unit need not be separate, but rather could be consolidated into one unit and one microcontroller. In addition, equivalence to the detailed electronic schematic diagrams could also be used without departing from the scope of the present invention.

Although the preferred embodiment utilizes an approximation method for generating a seed graph, other alternate embodiments of the invention could use the actual equation for the actual planter characteristic. Although the computational requirements of such a scheme would be more complex, the resulting algorithm would still be within the scope of the present invention. It is therefore manifestly intended that the scope of the present invention be limited not by this detailed description, but rather by the claims appended hereto.

What is claimed is:

1. A monitor apparatus for use with a mobile seed planting apparatus which allows customization using user-defined planting rate information, comprising:
   speed sensing means for sensing the speed of the planting apparatus;
   seed sensing means for sensing seeds being planted and for producing therefrom a plurality of seed signals, each seed signal indicative of the presence of a seed being planted;
   means for counting and accumulating the seed signals over a selected period of time and producing therefrom a monitored seed rate;
   data input means for receiving the user-defined planting rate information from the user, wherein the user-defined planting rate information represents seed sensor performance over a range of seed rates;
   control means connected to the speed sensing means and connected to receive the user-defined planting rate information and for generating a seed graph therefrom, wherein the seed graph approximates the user-defined planting rate information and is comprised of a plurality of connected segments; and
   wherein the control means is further connected to receive the monitored see rate, and is further adapted for determining on which segment of the seed graph the monitored seed rate is located, and determining therefrom a corrected actual seed rate.

2. A method for monitoring the performance of a mobile planter apparatus, comprising the steps of:
   a) sensing the speed of the mobile planter apparatus;
   b) dropping seeds through a seed sensor;

c) counting the seeds dropped through the seed sensor and producing therefrom a seed count;

d) converting the seed count into a monitored seed rate;

e) experimentally determining actual seed rates over a range of seed rates as monitored;

f) generating a seed graph representative of the experimentally determined planter characteristics;

g) calculating a corrected seed rate from the monitored seed rate and the seed graph.

3. The method according to claim 2, further including the steps of:

h) receiving operator selected data concerning actual target seed rate;

i) calculating a percent error of the corrected actual seed rate from the target seed rate; and j) displaying the percent error so an operator may modify the speed of the planter apparatus to more closely approximate the target seed rate.

4. The method according to claim 2, wherein experimentally determining step (e) further includes the steps of:

(e1) receiving a plurality of operator selected data points corresponding to characteristics of the planter apparatus at a plurality of different seed planting rates; and (e2) generating a plurality of equations, each equation corresponding to one of a plurality of segments, wherein the segments are defined by the plurality of operator selected data points.

5. The method according to claim 4 wherein calculating step (g) further includes the steps of:

(g1) selecting one of the plurality of segments on which the monitored seed rate is located and thus selecting the corresponding equation; and (g2) calculating the corrected actual seed rate from the monitored seed rate and the selected equation.

6. A monitor system for a mobile seed planting apparatus, comprising:

seed sensing means for sensing the speed of the planting apparatus;

seed sensing means for sensing seeds being planted by the planting apparatus and for producing therefrom a plurality of seed signals, each seed signal indicative of the presence or absence of a seed being planted;

rate means, connected to receive the plurality of seed signals for calculating therefrom a monitored seed rate;

storage means for storing a seed graph, wherein the seed graph comprises a representation of experimentally determined actual seed rates versus a range of seed rates as monitored and wherein the seed graph is further indicative of inaccuracies of the seed sensing means at high seed rates;

control means, connected to receive the monitored seed rate and the speed of the planting apparatus and further connected for access to the seed graph, for calculating a corrected actual seed rate, wherein the control means determines the corrected actual seed rate by referencing the monitored seed rate to the experimentally determined actual seed rates, such that the corrected actual seed rate is very accurate despite the inaccuracies of the seed sensing means at high seed rates; and display means for displaying the corrected actual seed rate.

7. The apparatus according to claim 6 further including:

data input means for receiving an operator entered target seed rate; and error means for calculating the percent error of the corrected actual seed rate from the target seed rate;

wherein said display means is further adapted for displaying said percent error such that the operator may make appropriate adjustments to the planting apparatus such that the corrected actual seed rate more closely approximates the target seed rate.

8. The monitor system according to claim 1 further including:

data input means for receiving a plurality of operator selected data points, said data points corresponding to experimentally determined actual seed rates over a range of seed rates as monitored;

said seed graph further comprised of a plurality of equations, each corresponding to one of a plurality of segments, wherein the segments are defined by the plurality of operator selected data points;

said control means further for identifying on which of the segments the monitored seed rate is located and identifying therefrom the equation corresponding to the identified segment; and wherein the corrected actual seed rate is determined by reference to the identified equation.

* * * * *